(12) United States Patent
Suzuki

(10) Patent No.: US 8,873,976 B2
(45) Date of Patent: Oct. 28, 2014

(54) IMAGE FORMING APPARATUS, SYSTEM AND METHOD

(75) Inventor: Masakazu Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/344,002

(22) PCT Filed: Apr. 23, 2012

(86) PCT No.: PCT/JP2012/060866
§ 371 (c)(1),
(2), (4) Date: Mar. 10, 2014

(87) PCT Pub. No.: WO2013/046777
PCT Pub. Date: Apr. 4, 2013

(65) Prior Publication Data
US 2014/0233967 A1 Aug. 21, 2014

(30) Foreign Application Priority Data

Sep. 30, 2011 (JP) ................................. 2011-216113

(51) Int. Cl.
*G03B 15/00* (2006.01)
*G03G 15/00* (2006.01)

(52) U.S. Cl.
CPC ................................. *G03G 15/5016* (2013.01)
USPC .......................................................... 399/12

(58) Field of Classification Search
CPC ................................................ G03G 15/5016
USPC .......................................................... 399/12
See application file for complete search history.

(56) References Cited

U.S. PATENT DOCUMENTS

| | | | | |
|---|---|---|---|---|
| 7,149,438 B2 * | 12/2006 | Sasaki | ............................. | 399/27 |
| 7,738,799 B2 * | 6/2010 | Kikuchi | .......................... | 399/12 |
| 8,005,376 B2 * | 8/2011 | Jeon | ................................. | 399/12 |
| 2003/0031475 A1 * | 2/2003 | Asakura | .......................... | 399/12 |
| 2005/0078969 A1 * | 4/2005 | Kikuchi | .......................... | 399/12 |
| 2005/0196180 A1 * | 9/2005 | Harumoto | ....................... | 399/12 |
| 2007/0297815 A1 * | 12/2007 | Takada | ............................. | 399/12 |
| 2008/0316533 A1 | 12/2008 | Kawai | | |
| 2010/0290791 A1 | 11/2010 | Sonoda et al. | | |
| 2011/0170889 A1 * | 7/2011 | Kawai | ............................. | 399/58 |
| 2013/0088740 A1 * | 4/2013 | Nishimura | ................... | 358/1.14 |
| 2013/0089343 A1 * | 4/2013 | Nishimura | ...................... | 399/12 |

FOREIGN PATENT DOCUMENTS

| | | |
|---|---|---|
| JP | 2002-202697 A | 7/2002 |
| JP | 2008-268454 A | 11/2008 |
| JP | 2009-3294 A | 1/2009 |
| JP | 2009-145396 A | 7/2009 |
| JP | 2009-210774 A | 9/2009 |
| JP | 2009-300694 A | 12/2009 |
| JP | 2010-266588 A | 11/2010 |
| JP | 2011-130020 A | 6/2011 |

* cited by examiner

*Primary Examiner* — Rodney Fuller
(74) *Attorney, Agent, or Firm* — Birch, Stewart, Kolasch & Birch, LLP

(57) ABSTRACT

Provided is an image forming apparatus capable of reducing possibility that small symbols and characters become invisible without impairing user's convenience even in the case of using a nongenuine replacement part. An image forming apparatus (100) is provided with: an image forming portion (103) for forming an image; a nongenuine product judging portion (101*a*) for judging whether or not a replacement part of the image forming portion (103) is a nongenuine product; an operation receiving portion (for example, an operating panel (102)) for receiving user operation including setting operation of an image forming condition; and a control portion (101) for controlling image formation of the image forming portion (103) based on the image forming condition set from the operation receiving portion. In the image forming apparatus (100), in a case where the replacement part of the image forming portion (103) is judged as a nongenuine product by the nongenuine product judging portion (101*a*), the control portion (101) prohibits setting operation concerning reduced printing among the setting operations of image forming conditions.

9 Claims, 16 Drawing Sheets

IMAGE FORMING APPARATUS, SYSTEM AND METHOD

TECHNICAL FIELD

The present invention relates to an image forming apparatus, a system and a method, and more particularly to an image forming apparatus provided with a function that judges whether or not a replacement part is a nongenuine product, an image forming system provided with the image forming apparatus and an information processing apparatus, and an image forming method by means of the image forming apparatus.

BACKGROUND OF THE INVENTION

For replacement parts of a photoreceptor drum, a transfer belt, a toner cartridge and the like which are used for an image forming apparatus such as a multi-functional peripheral, a distributor of a device provides genuine supplies thereof for assuring print quality, while a third party other than the distributor has been increasingly selling supplies as interchangeable parts. The interchangeable parts are inexpensively supplied, whose print quality is however not assured at all, and a seller of the interchangeable parts has not been responsible for maintenance of equipment under the current circumstances. Further, the image forming apparatus itself is not designed to support even nongenuine supplies. Thus, in the case of using a nongenuine product, blur, fog and the like of printing are notably caused under environmental conditions such as high temperature, high humidity, low temperature, low humidity and the like, thus reducing print quality.

For example, when a nongenuine product of a toner is used in the image forming apparatus, since toner characteristics and setting of development bias are insufficient, there is a case where the amount of toner attached to the photoreceptor drum becomes large to cause fog on recording paper. Moreover, conversely, when the amount of toner attached to the photoreceptor drum is small, blur is caused on recording paper.

Further, when the nongenuine toner is not adapted to setting of an apparatus of the image forming apparatus, there is a case where a toner transferred on recording paper is not fused fully at a fixing portion and the toner is not fixed on the recording paper or a case where it is fused too much at the fixing portion and characters are collapsed. When the toner characteristics and heating temperature of the fixing portion are inappropriate like this, in both cases, adverse effect is given on a printed image, such as that the toner is attached to a heat roller to thereby contaminate recording paper for which printing is performed next time, or that the toner is attached to the side of a pressurizing roller to thereby contaminate front and back sides of recording paper. In particular, as temperature and humidity becomes higher, image density becomes higher and fog is caused more easily, and as a printing rate becomes higher, an incidence rate of fog also tends to be increased.

For such a problem, for example, Patent Document 1 describes an image forming apparatus recognizable whether or not a replacement part is a genuine product. In such an image forming apparatus, manufacturer name information of a toner is read from a memory tag incorporated in a toner cartridge to compare the read company name information to company name information stored in advance, and determination is made, in the case of match, that a mounted toner cartridge is a genuine product to display the company name information on a display portion, followed by execution of image density correction action, while determination is made, in the case of mismatch, that the mounted toner cartridge is a nongenuine product not to display the company name information on the display portion, as well as displaying that the image density correction action is not executed.

Additionally, Patent Document 2 describes an image forming apparatus capable of selecting a first mode assuming use of genuine consumables and a second mode permitting use of nongenuine consumables. Such an image forming apparatus is comprised of consumables judgment means for judging whether mounted consumables are genuine or nongenuine, and print job receiving means for receiving a print instruction, in which, when the first mode is selected, in a case where consumables to be used in order to reproduce a color instructed for printing in the print job receiving means includes consumables judged as nongenuine by the consumables judgment means, the consumables judged as nongenuine is not used, and only the consumables judged as genuine is used to form an image.

PRIOR ART DOCUMENT

Patent Documents

Patent Document 1: Japanese Laid-Open Patent Publication No. 2010-266588
Patent Document 2: Japanese Laid-Open Patent Publication No. 2009-300694

SUMMARY OF THE INVENTION

Problem to be Solved by the Invention

As described above, under circumstances where a nongenuine product of a toner is used in the image forming apparatus to cause unevenness of an image, such as blur and fog, a situation that thin lines such as rules and underlines, and small symbols such as a comma and a period are invisible on recording paper due to blur, and a situation that such small symbols and characters become invisible due to fog possibly occur. Note that, not only when a nongenuine product of a toner is used in the image forming apparatus but also when a nongenuine product is used for a replacement part other than a toner, such a situation that accurate print is not able to be attained and therefore unevenness of an image is caused, so that small symbols and characters become invisible on recording paper possibly occurs.

In the meantime, since the above-described supplies are replaced or replenished by a manager, a general user performs printing by intending that favorable printing is to be performed under the current circumstances. Accordingly, in a case where the general user uses the image forming apparatus in which a nongenuine replacement part is mounted to perform reduced printing, because of not knowing that small symbols and characters become invisible due to fog and blur in advance, it becomes necessary to perform printing so as not to involve reduction by performing an operation again, resulting that extra labors, recording paper and electric power become required.

Whereas, with techniques described in the above-described Patent Documents 1 and 2, on the grounds that it is impossible to perform favorable printing in the case of detecting that a toner cartridge is a nongenuine product, image density correction is prohibited, or printing is performed only with a genuine product without using a nongenuine product in a case where high image quality is required, however, a relation between a defect of image quality due to a nongenuine product and reduced printing has never been considered. Further, in a case where a nongenuine product is used, a method of prohibiting printing operation is also considered, however, a uniform ban results in significantly impaired user's convenience.

The present invention is devised in light of the above-described circumstances, and an object thereof is to provide an image forming apparatus capable of reducing possibility that small symbols and characters become invisible without impairing user's convenience even in the case of using a nongenuine replacement part, an image forming system provided with the image forming apparatus and an information processing apparatus, and an image forming method by means of the image forming apparatus.

Means for Solving the Problem

For solving the above-described problems, a first technical means of the present invention is an image forming apparatus comprising: an image forming portion for forming an image; a nongenuine product judging portion for judging whether or not a replacement part of the image forming portion is a nongenuine product; an operation receiving portion for receiving user operation including setting operation of an image forming condition; and a control portion for controlling image formation of the image forming portion based on the image forming condition set from the operation receiving portion, characterized in that in a case where the replacement part of the image forming portion is judged as a nongenuine product by the nongenuine product judging portion, the control portion prohibits setting operation concerning reduced printing among the setting operations of the image forming conditions.

A second technical means is characterized in that the setting operation concerning the reduced printing prohibited by the control portion is setting operation for reducing an image to be printed with a reduction rate less than predetermined one, in the first technical means.

A third technical means is characterized in that the setting operation concerning the reduced printing prohibited by the control portion includes setting operation for performing aggregate printing, in the first technical means.

A fourth technical means is characterized in that the setting operation concerning the reduced printing prohibited by the control portion includes setting operation for performing reduced printing so as to fit to a paper size, in the first technical means.

A fifth technical means is an image forming system in which an image forming apparatus having an image forming portion for forming an image and a nongenuine product judging portion for judging whether or not a replacement part of the image forming portion is a nongenuine product, and an information processing apparatus in which a printer driver for the image forming apparatus is installed are connected via a network, characterized in that the printer driver receives information indicating a judgment result at the nongenuine product judging portion from the image forming apparatus via the network, judges whether or not the replacement part of the image forming portion is a nongenuine product based on the information, and in a case where judgment is made as a nongenuine product, displays a user interface image which prohibits setting operation concerning reduced printing among the setting operations of image forming conditions.

A sixth technical means is characterized in that the setting operation concerning the reduced printing prohibited by the printer driver is setting operation for reducing an image to be printed with a reduction rate less than predetermined one, in the fifth technical means.

A seventh technical means is characterized in that the setting operation concerning the reduced printing prohibited by the printer driver includes setting operation for performing aggregate printing, in the fifth technical means.

An eighth technical means is characterized in that the setting operation concerning the reduced printing prohibited by the printer driver includes setting operation for performing reduced printing so as to fit to a paper size, in the fifth technical means.

A ninth technical means is an image forming method by means of an image forming apparatus comprising an image forming portion for forming an image, a control portion for controlling image formation of the image forming portion based on an image forming condition set through an operation receiving portion, or a printer driver installed in an information processing apparatus which is connected to the image forming apparatus via the network, and a non-genuine product judging portion for judging whether or not a replacement part of the image forming portion is a non-genuine product, wherein the image forming method comprising: a judging step that the nongenuine product judging portion judges whether or not a replacement part of the image forming portion is a nongenuine product, a prohibition step that the control portion or the printer driver, in the case of judging that the replacement part of the image forming portion is a nongenuine product at the judging step, prohibits setting operation concerning reduced printing among setting operations of image forming conditions, and an image forming step that the image forming portion performs image formation based on the set image forming condition.

Effect of the Invention

According to the present invention, when judgment is made that a replacement part other than a genuine product supplied by a manufacturer (that is, a nongenuine replacement part) is used inside the image forming apparatus, reduced printing is prohibited to restrict printing of small symbols and characters as much as possible, so that it is possible to reduce possibility that small symbols and characters become invisible without impairing user's convenience even in the case of using a nongenuine replacement part.

PREFERRED EMBODIMENT OF THE INVENTION

Hereinafter, description will be given for preferred embodiments of an image forming apparatus, a system thereof and a method of the present invention with reference to accompanying drawings.

Figure 1:
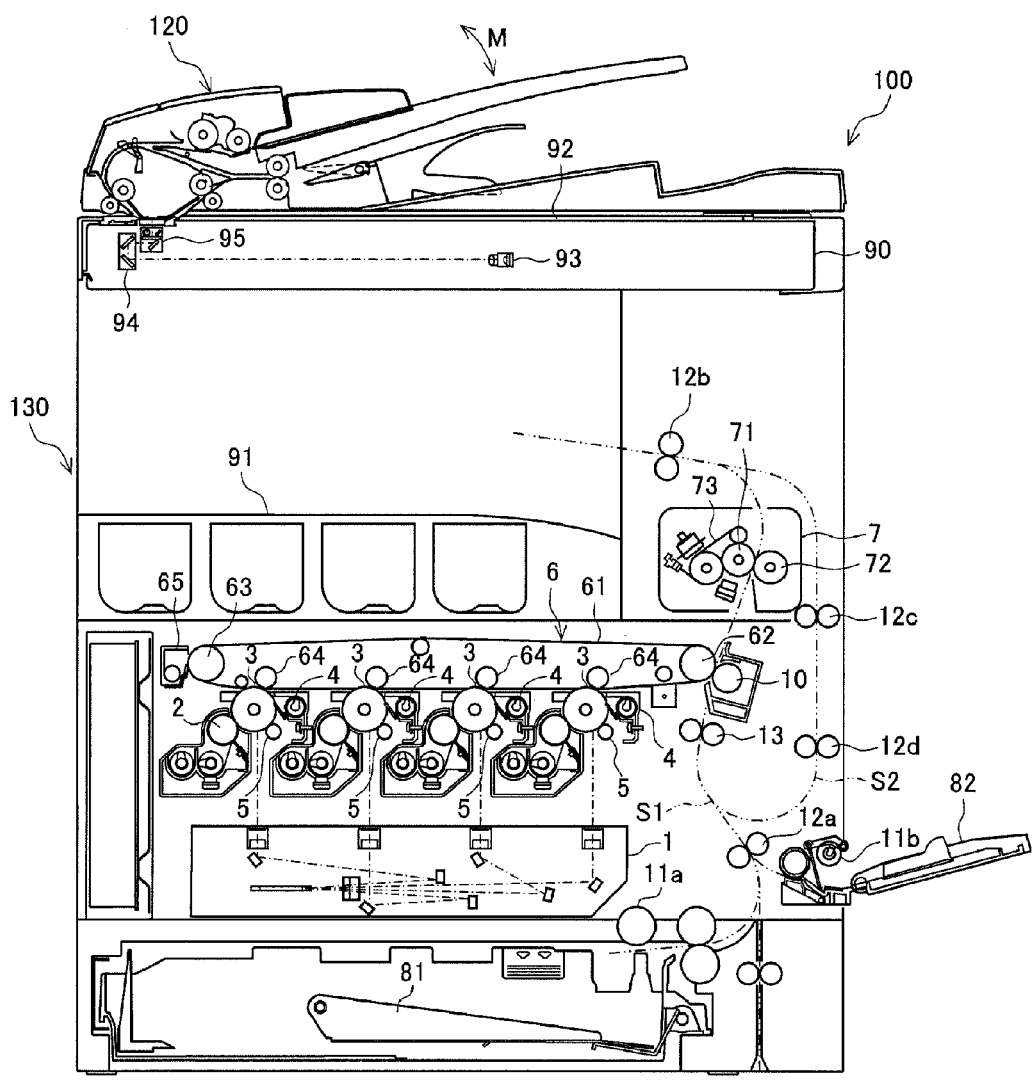
FIG. 1 is a diagram showing an embodiment in which an image forming apparatus according to the present invention is configured as a multi-functional peripheral.

FIG. 1 is a diagram showing an embodiment in which the image forming apparatus according to the present invention is configured as a multi-functional peripheral, showing an example of the image forming apparatus configured as a multi-functional peripheral provided with a scanner function.

An image forming apparatus 100 forms an image on recording paper from image data which is transmitted from the outside, or read by a scanner (image reading means), and is comprised of an apparatus 130 and an automatic document processing device 120.

The apparatus 130 includes an exposure unit 1, a developing equipment 2, a photoreceptor drum 3, a cleaner unit 4, a charger 5, an intermediate transfer belt unit 6, a fixing unit 7, a paper feeding cassette 81, a paper discharge tray 91 an the like.

In an upper part of the apparatus 130, a document platen 92 made of transparent glass is provided, and on an upper side thereof, the automatic document processing device 120 is installed for automatically feeding a document onto the document platen 92. The automatic document processing device 120 is configured so as to rotate freely in an arrow M direction, and the top of the document platen 92 is opened so that it is possible to place a document by hand.

The apparatus 130 includes image reading means 90 that is contained in a housing. The image reading means 90 is reduced optical system image reading means which is comprised of a light source unit 93 holding a light source and a first mirror, a mirror unit 94 holding a second mirror and a third mirror, a lens and a CCD 95. Further, the apparatus 130 is provided with a not illustrated operation panel so as to enable operation input by a user. Moreover, the apparatus 130 is provided with means for inputting image data from a device connected to the outside, or means for reading image data from a transportable recording medium (both of them are not illustrated).

Image data which is processed in the image forming apparatus 100 corresponds to a color image in four colors of black (K), cyan (C), magenta (M) and yellow (Y), for example. Accordingly, four pieces for each of the developing equipment 2, the photoreceptor drum (image carrier) 3, the charger 5 and the cleaner unit 4 are provided so as to form four types of latent images corresponding to each color, whereby four image stations are constituted.

The charger 5 is a charging means for uniformly charging the surface of the photoreceptor drum 3 to predetermined potential, and for which, contact-type roller type and brush type chargers are used in addition to a charger type as shown in FIG. 1 in some cases.

The exposure unit 1 is configured as a laser scanning unit (LSU) provided with a laser emission portion, a reflective mirror and the like. In the exposure unit 1, a polygon mirror that scans by a laser beam, and optical elements such as a lens, a mirror and the like for guiding a laser beam that is reflected by the polygon mirror to the photoreceptor drum 3 are arranged. In addition, for the exposure unit 1, it is also possible to employ a method of using, for example, EL and LED writing heads in which light-emitting devices are disposed in an array.

The exposure unit 1 includes a function for exposing the charged photoreceptor drum 3 according to input image data, thereby, on which surface, forming an electrostatic latent image according to the image data. The developing equipment 2 forms the electrostatic latent image that is formed on each of the photoreceptor drums 3 with toners in four colors (Y, M, C and K). Further, the cleaner unit 4 removes/collects a toner which remains on the surface of the photoreceptor drum 3 after development and image transfer.

The intermediate transfer belt unit 6 that is arranged on an upper side of the photoreceptor drum 3 is provided with an intermediate transfer belt 61, an intermediate transfer belt driving roller 62, an intermediate transfer belt driven roller 63, an intermediate transfer roller 64 and an intermediate transfer belt cleaning unit 65. Four intermediate transfer rollers 64 are provided corresponding to each color of Y, M, C and K.

The intermediate transfer belt 61 is stretched out among and rotationally driven by the intermediate transfer belt driving roller 62, the intermediate transfer belt driven roller 63 and the intermediate transfer roller 64. Further, each intermediate transfer roller 64 imparts transfer bias for transferring a toner image of the photoreceptor drum 3 onto the intermediate transfer belt 61.

The intermediate transfer belt 61 is provided in contact with each photoreceptor drum 3. Then, toner images in respective colors that are formed on the photoreceptor drum 3 are sequentially superimposed on and transferred onto the intermediate transfer belt 61, thereby forming a color toner image (multicolor toner image) on the intermediate transfer belt 61. The intermediate transfer belt 61 is formed in an endless shape with use of, for example, a film with thickness of about 100 μm to 150 μm.

The toner image is transferred from the photoreceptor drum 3 to the intermediate transfer belt 61 by the intermediate transfer roller 64 in contact with a back side of the intermediate transfer belt 61. To the intermediate transfer roller 64, high-voltage transfer bias (high voltage with polarity (+) opposite to charging polarity (−) of a toner) is applied in order to transfer the toner image. The intermediate transfer roller 64 is a roller based on a metal (for example, stainless-steel) axis with a diameter of 8 to 10 mm, whose surface is covered by a conductive elastic material (for example, EPDM, urethane form or the like). Such a conductive elastic material allows high voltage to be uniformly applied to the intermediate transfer belt 61. In this structural example, a roller shape is used as transfer electrode, however, a brush type or the like is also usable otherwise.

An electrostatic image which is formed on each photoreceptor drum 3 corresponding to each color phase as described above is layered on the intermediate transfer belt 61. The electrostatic image layered in this manner is transferred onto recording paper by the transfer roller 10 as a secondary transcriptional mechanical portion described below that is arranged in a contact position of a sheet and the intermediate transfer belt 61 by rotation of the intermediate transfer belt 61. As the secondary transcriptional mechanical portion, not only a transfer roller but also a corona charger as well as a transfer belt are also usable.

At the time, the intermediate transfer belt 61 is brought into contact with the transfer roller 10 by giving a predetermined nip, and voltage is applied to the transfer roller 10 in order to transfer a toner to a sheet (high voltage of polarity (+) opposite to charging polarity (−) of a toner). Further, for the purpose of steadily obtaining the above-described nip by the transfer roller 10, either one of the transfer roller 10 or the intermediate transfer belt driving roller 62 is made of a hard material (metal or the like), and the other is made of a soft material such as an elastic roller (an elastic rubber roller, a formable resin roller or the like).

Moreover, as described above, a toner which attaches to the intermediate transfer belt 61 by contact with the photoreceptor drum 3 or a toner which remains on the intermediate transfer belt 61 without being transferred onto recording paper by the transfer roller 10, because of causing generation of a mixed color of toners at next step, is set to be removed/collected by the intermediate transfer belt cleaning unit 65. The intermediate transfer belt cleaning unit 65 is provided with, for example, a cleaning blade as a cleaning member in contact with the intermediate transfer belt 61, and the intermediate transfer belt 61 in contact with the cleaning blade is supported by the intermediate transfer belt driven roller 63 on the back side thereof.

The paper feeding cassette 81 is a tray for accumulating recording paper (sheets) to be used for image formation, and provided on a lower side of the exposure unit 1 of the apparatus 130. Additionally, the recording paper to be used for image formation is able to be placed also in a manual paper feeding cassette 82. Further, the paper discharge tray 91 provided above the apparatus 130 is a tray for piling up the printed recording paper facedown.

Further, the apparatus 130 is provided with a paper conveyance path S1 in an approximately vertical shape for feeding recording paper in the paper feeding cassette 81 and the manual paper feeding cassette 82 to the paper discharge tray 91 through the transfer roller 10 and the fixing unit 7. Near the paper conveyance path S1 from the paper feeding cassette 81 or the manual paper feeding cassette 82 to the paper discharge tray 91, pick-up rollers 11a and 11b, a plurality of conveying rollers 12a to 12d, a registration roller 13, the transfer roller 10, the fixing unit 7 and the like are arranged.

The conveying rollers 12a to 12d are small-size rollers for promoting and assisting conveyance of recording paper, a plurality of which are arranged along the paper conveyance path S1. Further, the pick-up roller 11a is provided near the end of the paper feeding cassette 81, and picks recording paper up from the paper feeding cassette 81 sheet by sheet for supplying to the paper conveyance path S1. Similarly, the pick-up roller 11b is provided near the end of the manual paper feeding cassette 82, and picks recording paper up from the manual paper feeding cassette 82 sheet by sheet for supplying to the paper conveyance path S1.

Furthermore, the registration roller 13 keeps once the recording paper conveyed through the paper conveyance path S1. And, provided is a function for conveying the recording paper to the transfer roller 10 at the time of lining up a leading end of a toner image on the photoreceptor drum 3 with a leading end of the recording paper.

The fixing unit 7 is provided with a heat roller 71 and a pressurizing roller 72. The heat roller 71 and the pressurizing roller 72 rotate by holding recording paper therebetween. Additionally, the heat roller 71 is set so as to be at predetermined fixing temperature by control means based on a signal from a not-shown temperature detector, and has a function for bringing with the pressurizing roller 72 a toner into thermo-compression bonding to recording paper, thereby applying fusing, mixing and pressure-contact to a multicolor toner image that is transferred to the recording paper for bringing the recording paper into heat fixing. Further, an outer heating belt 73 is provided for heating the heat roller 71 from outside.

Next, description will be given more specifically for a sheet conveyance path of recording paper. As described above, the image forming apparatus 100 is provided in advance with the paper feeding cassette 81 and the manual paper feeding cassette 82 for containing recording paper. In order to feed recording paper from these paper feeding cassettes 81 and 82, for which, the pick-up rollers 11a and 11b are respectively arranged to guide the recording paper to the paper conveyance path S1 sheet by sheet.

The recording paper that is conveyed from each of the paper feeding cassettes 81 and 82 is conveyed to the registration roller 13 by the conveying roller 12a of the paper conveyance path S1, then conveyed to the transfer roller 10 at the time of matching a leading end of the recording paper to a leading end of image information on the intermediate transfer belt 61, in which the image information is written onto the recording paper. Thereafter, the recording paper passes through the fixing unit 7, whereby an unfixed toner on the recording paper is fused and fixed by heat, then discharged onto the paper discharge tray 91 through the arranged conveying roller 12b.

The above-described conveyance path is shown at the time of requesting single-sided printing for recording paper, and on the other hand, at the time of requesting double-sided printing, when a rear end of the recording paper which passes through the fixing unit 7 after completing single-sided printing as described above is held by the last conveying roller 12b, the recording paper is guided to a conveyance path S2 in which the conveying rollers 12c and 12d are arranged by a reverse rotation of the conveying roller 12b. Then, the conveyance path S2 joins the conveyance path S1, and the recording paper is conveyed from the registration roller 13 to the transfer roller 10. At the time, a front/back side of the recording paper is reversed at a stage of joining from the conveyance path S2 to the conveyance path S1, and printing is thus performed on the back side of the recording paper at the transfer roller 10. Then, the recording paper on which the back side is printed is fixed by the fixing unit 7 to be discharged to the paper discharge tray 91.

Figure 2:
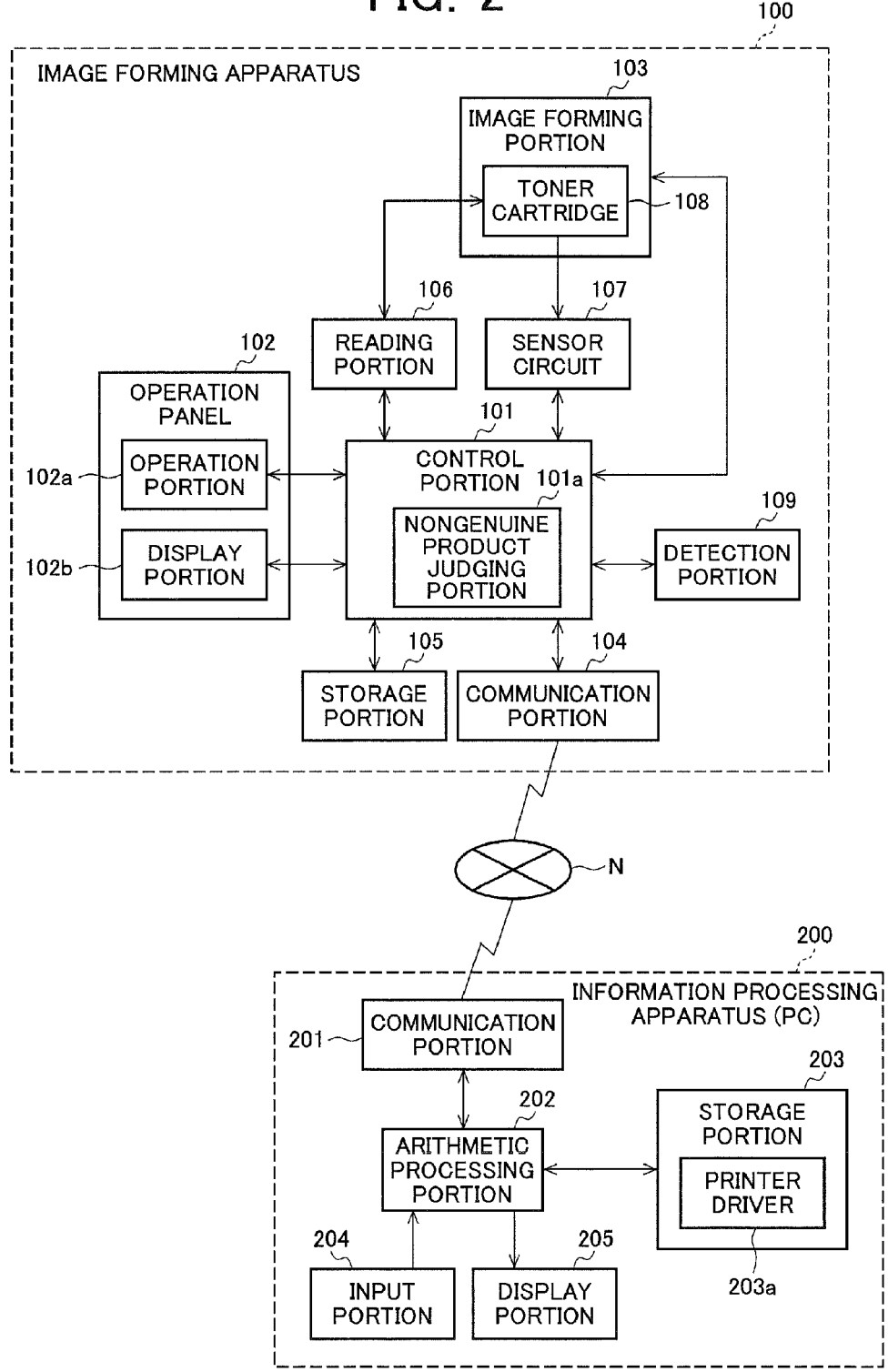
FIG. 2 is a block diagram showing an exemplary main configuration of the image forming apparatus according to the present invention and an information processing apparatus.

FIG. 2 is a block diagram showing an exemplary main configuration of the image forming apparatus according to the present invention and an information processing apparatus. The image forming apparatus 100 is configured as, for example, the above-described multi-functional peripheral, comprised of a control portion 101 for controlling each function of the image forming apparatus 100 to be realized by a microcomputer having a CPU, a ROM (and/or EEPROM), a RAM and the like inside thereof; an operation panel 102 composed of an operation portion 102a and a display portion 102b; an image forming portion 103 for forming an image shown by image data on recording paper according to control of the control portion 101; a communication portion 104 for connecting to an information processing apparatus 200 via a network N; a storage portion 105 such as a hard disk; a reading portion 106 for reading ID information from an IC chip imparted to a toner cartridge 108; a sensor circuit 107 composed of a peripheral circuit for processing various sensors and signals from the sensors; the toner cartridge 108 as an example of a replacement part; and a detection portion 109 for detecting temperature and/or humidity.

In the above-described microcomputer, so-called firmware (program) of the image forming apparatus 100 is stored so as to be executable. This firmware is, for example, stored in a state of being rewritable in the above-described EEPROM, or stored in the above-described ROM. Note that, this program is able to be distributed via a transportable recording medium having it recorded therein so as to be readable by a computer, or a network. Further, though not illustrated in FIG. 2, the image forming apparatus 100 is provided with other components such as the scanner as exemplified in FIG. 1. Moreover, as the above-described image data to be printed, data read by this scanner, and data received as a print job from the communication portion 104 are cited.

The operation panel 102 is an example of an operation receiving portion for receiving user operation including setting operation of an image forming condition, and a touch panel on which input operation is enabled with respect to an operation screen is configured by the operation portion 102a and the display portion 102b. The operation portion 102a of the operation panel 102 receives user operation for outputting to the control portion 101. Further, the display portion 102b of the operation panel 102 displays an operation screen and various types of information. Each operation screen displayed on the display portion 102b, including a setting screen for performing operation of setting the image forming condition, is stored as a graphical user interface (GUI) image in a storage area capable of being output to the display portion 102b, for example, such as the storage portion 105. In the case of printing, for example, image data read by the scanner or image data stored in the storage portion 105, the control portion 101 is to control image formation in the image forming portion 103 based on the image forming condition set from the operation panel 102. Note that, printing the image read by the scanner indicates executing copy.

Moreover, the information processing apparatus 200 is, for example, a general purpose PC (personal computer) comprised of a communication portion 201 for connecting to the image forming apparatus 100 via the network N; an arithmetic processing portion 202 composed of a CPU, a RAM, a ROM and the like for controlling each function of the information processing apparatus 200; a storage portion 203 such as a hard disk in which a printer driver 203a for the image forming apparatus 100 is installed; an input portion 204 such as a keyboard and a mouse; and a display portion 205 such as a liquid crystal display. The printer driver 203a is a software (program) which controls the image forming apparatus 100 for executing image forming processing (print processing). This printer driver 203a is read from the storage portion 203 by the arithmetic processing portion 202 in the case of executing printing to be developed and executed on the RAM of the arithmetic processing portion 202. Note that, this printer driver 203a is able to be distributed via a transportable recording medium having it recorded therein so as to be readable by a computer, or a network.

The control portion 101 of the image forming apparatus 100 is to control, in the case of printing image data, for example, such as a document file created in the information processing apparatus 200, image formation in the image forming portion 103 based on the image forming condition set in the printer driver 203a. In the image forming apparatus 100, this image data and the image forming condition are received as one print job to execute printing.

A main object of the image forming apparatus 100 according to the present invention is to reduce possibility that small symbols and characters become invisible by restricting printing of small symbols and characters such as rules, a comma and a period in the case of printing as much as possible without impairing user's convenience even in the case of using a nongenuine product for a replacement part. Here, description will be given for an example assuming that the image forming condition is set from the operation panel 102 of the image forming apparatus 100, and an example that the setting is performed from the information processing apparatus 200 will be described below.

As a configuration for attaining the above-described object, the image forming apparatus 100 is provided with a nongenuine product judging portion 101a for judging whether or not a replacement part of the image forming portion 103 is a nongenuine product, and, in a case where the replacement part of the image forming portion 103 is judged as a nongenuine product by the nongenuine product judging portion 101a, the control portion 101 prohibits setting operation concerning reduced printing among setting operations of the image forming conditions. Note that, this prohibition processing of the control portion 101 may be provided as, for example, one processing of firmware. Further, though an example that the nongenuine product judging portion 101a is realized as one function of the control portion 101 is taken, the nongenuine product judging portion 101a may be provided independently from the control portion 101.

In the above description, the replacement part configures a part of an apparatus in light of a function, whose performance is able to be recovered and retained by replacement. For example, a toner cartridge (or development cartridge), a photoreceptor cartridge, a cartridge in which a development member and a photoreceptor are integrally formed, an ink cartridge, a cartridge in which an ink tank and a print head are integrally formed, an ink sheet cartridge for a thermal transcription formula, and the like are applicable for the image forming apparatus 100. Then, these replacement parts are referred to as supplies in some cases. In this example, the toner cartridge 108 will be exemplified and explained as a replacement part, which is however not limited thereto, and not limited to any of the above-described cartridges. However, an example that a replacement part is the toner cartridge 108 will be taken below.

In FIG. 2, the nongenuine product judging portion 101a judges whether the toner cartridge 108 mounted on the image forming apparatus 100 is a genuine product or a nongenuine product. A judging method of the nongenuine product is able to be realized by means of conventional public known techniques of, for example, Japanese Laid-Open Patent Publication No. 2002-202697, Japanese Laid-Open Patent Publication No. 2009-145396 and the like in addition to techniques described in the above-described Patent Documents 1 and 2, which method is not particularly limited. Hereinafter, description will be given as an illustration for a case where judgment is made in the image forming apparatus 100 as a judging method of a nongenuine product by the nongenuine product judging portion 101a, however, an external server device or the like may be used for judgment.

Figure 3:
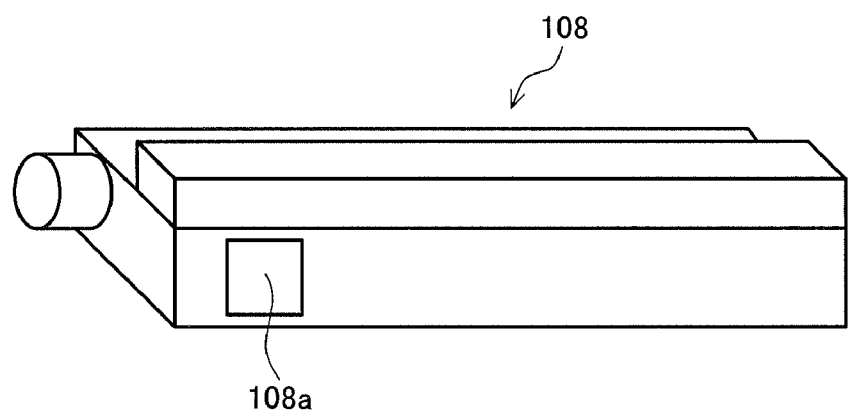
FIG. 3 is a diagram showing an example of a toner cartridge as a replacement part.

In the toner cartridge 108, specific ID information capable of individually specifying the toner cartridge 108 is recorded. For example, as shown in FIG. 3, the ID information is installed as an IC chip 108a to be recorded in advance in a non-volatile memory such an EEPROM and a ferroelectric memory inside thereof. Alternatively, such ID information may be configured by a simple method such as a bar code. The ID information may be an identification number or the like of a manufacturer because of only needing to recognize at least a manufacturer supplying a genuine product. Then, the reading portion 106 differs depending on a form of the ID information imparted to the toner cartridge 108, comprised of a bar code reader in the case of the bar code, or electric or high-frequency reading means in the case of an IC chip.

Additionally, in the storage portion 105, ID information of a genuine product of a toner cartridge is stored in advance, and in the case of confirming the toner cartridge 108 is replaced and mounted, the nongenuine product judging portion 101a compares ID information of the toner cartridge 108 read by the reading portion 106 to ID information of a genuine product stored in the storage portion 105 to judge whether or not the both of them are consistent with each other. Note that, a manufacturer of the image forming apparatus 100 may store all of ID information of a genuine product of a toner cartridge which is applicable to the image forming apparatus 100 in the storage portion 105 at a manufacturing process thereof, and ID information of a toner cartridge of a new product may be also newly storable according to version upgrade of firmware. In a case where the ID information is consistent with each other, judgment is made as a genuine product, and in a case where the ID information is not consistent with each other, judgment is made as a nongenuine product. Note that, it is considered that some nongenuine products are not given ID information, thus a product is judged as a nongenuine product when the reading portion 106 is incapable of reading the ID information of the product.

In the above description, replacement and mounting of the toner cartridge 108 are detectable by the sensor circuit 107. The sensor circuit 107 is, as described above, composed of a peripheral circuit for processing various sensors and signals from the sensors. A sensor is composed of a mechanical or optical door sensor and a cartridge sensor. The door sensor is a sensor for detecting an opening/closing state of a door of the image forming apparatus 100, and the cartridge sensor is a sensor for detecting whether or not the toner cartridge 108 is mounted on the image forming apparatus 100. The peripheral circuit includes a waveform shaping circuit for performing waveform shaping of sensor output, a filter circuit, a binarized circuit, a voltage level control circuit, and the like, in which the sensor output is converted to, for example, a digital signal having a logic level of 0 to 5 V.

The control portion 101 accesses the IC chip 108a when detecting that the toner cartridge 108 is replaced in the sensor circuit 107, and instructs the reading portion 106 to read ID information. Then, the nongenuine product judging portion 101a compares ID information read by the reading portion 106 to ID information stored in the storage portion 105, thereby judging whether the replaced toner cartridge 108 is a genuine product or a nongenuine product. In this manner, the nongenuine product judging portion 101a is able to judge whether the ID information is consistent/inconsistent with each other. Even in the case of being incapable of reading by the reading portion 106, judgment is made as inconsistency, that is, a nongenuine product.

Then, in a case where the replacement part of the image forming portion 103 is judged as a nongenuine product by the nongenuine product judging portion 101a, as described above, the control portion 101 prohibits setting operation concerning reduced printing among setting operations of the image forming conditions. An example that a replacement part is the toner cartridge 108 is taken. On the other hand, in a case where the image forming apparatus 100 is configured so that a plurality of parts are replaceable, processing may be performed with only one replacement part as a judgment target in the same manner, however, in a case where whether or not each replacement part is a nongenuine product is judged as described above and at least one replacement part is judged as a nongenuine product, setting operation concerning reduced printing may be prohibited.

Note that, though an example of an image forming system in which the image forming apparatus 100 and the information processing apparatus 200 are connected via the network N is taken in FIG. 2, as described here, in a case where the image forming apparatus 100 is configured to singly prohibit setting operation concerning reduced printing from the operation panel 102, of course, connection/non-connection to the information processing apparatus 200 does not matter.

In this manner, in the image forming apparatus 100 of the present invention, when judgment is made that a replacement part other than a genuine product supplied by a manufacturer (that is, a nongenuine replacement part) is used inside the image forming apparatus, reduced printing is prohibited to restrict printing of small symbols and characters as much as possible. Thus, according to the present invention, even in a case where a nongenuine replacement part is used, such as a case where nongenuine supplies such as a nongenuine toner do not conform to setting of the apparatus and a case where fog and blur are caused because of usage environment such as high temperature and high humidity, it is possible to reduce possibility that small symbols and characters become invisible (that is, increase possibility that printing contents are visible) without impairing user's convenience and prevent wasteful consumption of recording paper and toner.

Here, the setting operation concerning reduced printing that is prohibited by the control portion 101 is preferably setting operation for reducing an image to be printed less than a predetermined reduction rate. For example, setting operation for scaling the image to be printed with magnification for reducing less than 80% in ratio of one side is prohibited, or setting operation for scaling with magnification for reducing less than 50% in area ratio is prohibited. Further, the setting operation concerning reduced printing that is prohibited by the control portion 101 preferably includes setting operation for performing aggregate printing and/or setting operation for performing reduced printing to fit to a paper size. Note that, the setting operation for performing reduced printing to fit to a paper size indicates setting operation for performing such printing that an image is reduced among so-called "fit page printing" for performing printing to fit to a paper size.

Hereinabove, though description has been given assuming that the image forming condition is set from the operation panel 102 of the image forming apparatus 100, next, description will be given for a case where the setting is performed from the information processing apparatus 200 side, that is, a print processing example by means of an image forming system comprised of the image forming apparatus 100 and the information processing apparatus 200.

In FIG. 2 described above, the image forming apparatus 100 is provided with the communication portion 104 for sending information indicating a judgment result by the nongenuine product judging portion 101a (hereinafter, genuine part judgment information) to the information processing apparatus 200. The information processing apparatus 200 is provided with the communication portion 201 for receiving the genuine part judgment information. In order to enable to exchange such genuine part judgment information, if the genuine part judgment information is saved in the storage portion 105 till when a cartridge is replaced again, the control portion 101 of the image forming apparatus 100 is able to return just by requesting the genuine part judgment information at a predetermined timing from the printer driver 203a. This request is performed, simply when the printer driver 203a is activated, in conjunction with connection confirming with the image forming apparatus 100, and the control portion 101 of the image forming apparatus 100 may control to return in confirming the connection. Alternatively, even if the genuine part judgment information is not saved, judgment may be made by the nongenuine product judging portion 101a in requesting a judgment result from the printer driver 203a of the information processing apparatus 200.

The printer driver 203a of the information processing apparatus 200 then judges whether or not a replacement part of the image forming portion 103 is a nongenuine product based on the genuine part judgment information received from the image forming apparatus 100, and in a case where judgment is made as a nongenuine product, a user interface image which prohibits setting operation concerning reduced printing among setting operations of the image forming conditions is displayed.

Thereby, in the same manner as the case where the image forming apparatus 100 performs print processing singly (mainly the case of performing copy processing), even in a case where a nongenuine replacement part is used, it is possible to reduce possibility that small symbols and characters become invisible (that is, increase possibility that printing contents are visible) without impairing user's convenience and prevent wasteful consumption of recording paper and toner.

In this example as well, the setting operation concerning reduced printing that is prohibited by the printer driver 203a is preferably setting operation for reducing an image to be printed less than the predetermined reduction rate. Further, the setting operation concerning reduced printing that is prohibited by the printer driver 203a preferably includes setting operation for performing aggregate printing and/or setting operation for performing reduced printing to fit to a paper size.

Figure 4:
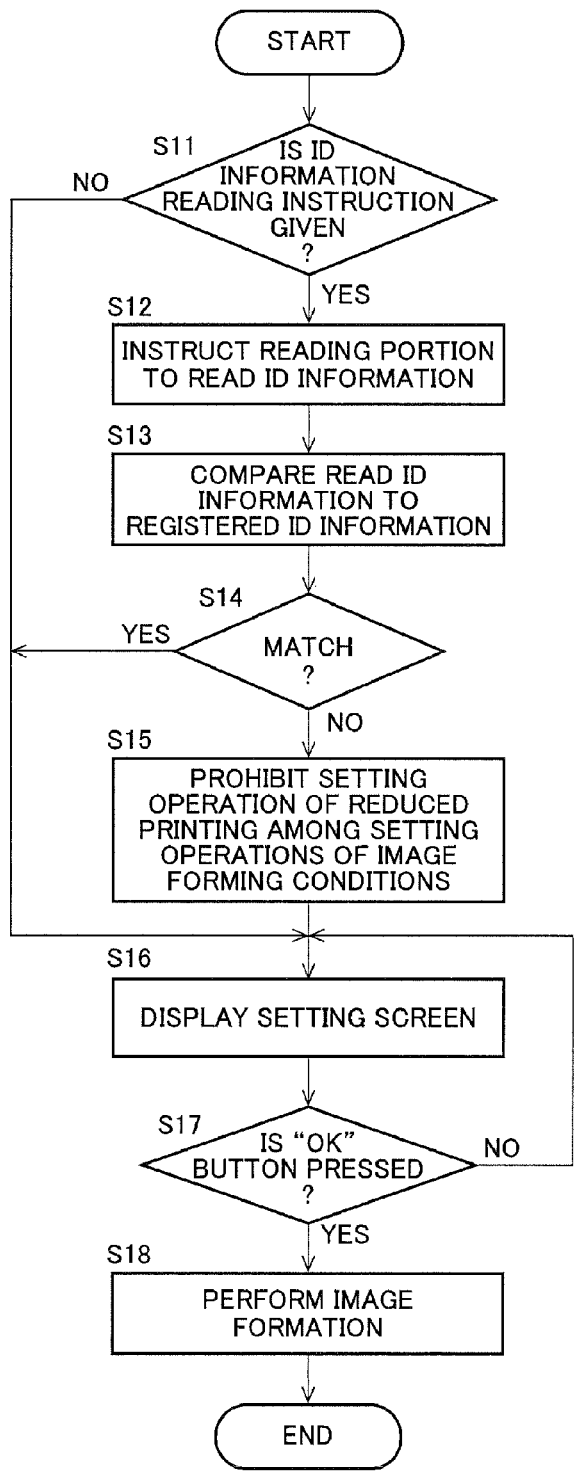
FIG. 4 is a flow diagram explaining an example of an image forming method by means of the image forming apparatus or an image forming system of the present invention.
Figure 5:
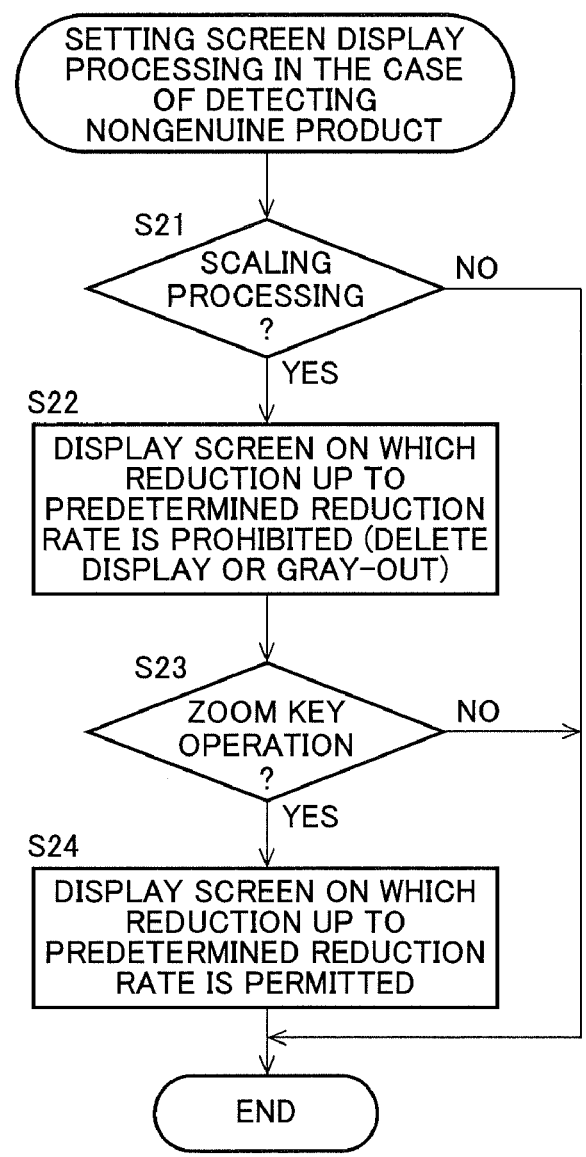
FIG. 5 is a flow diagram explaining an example of setting screen display processing in the case of detecting a nongenuine product in the image forming method of FIG. 4.

Next, description will be given for an example of an image forming method by means of the image forming apparatus or the image forming system of the present invention with reference to FIG. 4 and FIG. 5. FIG. 4 is a flow diagram explaining an example of the image forming method by means of the image forming apparatus or the image forming system of the present invention, and FIG. 5 is a flow diagram explaining an example of setting screen display processing in the case of detecting a nongenuine product in the image forming method of FIG. 4.

In this example, description will be given for a case where an ID information reading instruction is given when the sensor circuit 107 detects the toner cartridge 108 is mounted based on the configuration of the image forming apparatus 100 of FIG. 2. However, the ID information reading instruction may be given when power of the image forming apparatus 100 is turned on or when the image forming apparatus 100 is reset such as by opening/closing a cover which is provided in the periphery and opened in maintenance.

First, the control portion 101 judges whether or not the ID information reading instruction is given from the sensor circuit 107 along with mounting of the toner cartridge 108 (step S11), and in the case of judging that the ID information reading instruction is given (in the case of YES), instructs the reading portion 106 to read ID information of the toner cartridge 108 to execute reading (step S12). Note that, the information to be read may not be ID information and may be a manufacturer name of the image forming apparatus 100, and an instruction may be given to read information of a usage amount of a toner and the like at the same time. Next, the control portion 101 (nongenuine product judging portion 101a) compares ID information read by the reading portion 106 to ID information stored in the storage portion 105 (registered ID information) (step S13). Then, the control portion 101 judges whether or not both of them are consistent with each other (step S14).

The case where both of them are consistent with each other (in the case of YES at step S14) means that the toner cartridge 108 is judged as a genuine product. In this case, the control portion 101 displays a normal setting screen (GUI image) of the image forming condition without prohibition of the image forming condition on the operation panel 102 according to predetermined operation (copy operation or print operation) by a user (step S16), and proceeds to step S17.

Then, the control portion 101 judges whether or not an "OK" button is pressed on such a normal setting screen (step S17), and in the case of judging that the "OK" button is pressed (in the case of YES), instructs the image forming portion 103 to perform image formation based on the image forming condition input from the setting screen displayed at step S16 according to predetermined operation (for example, pressing of a copy start button, a print start button or the like) by the user (step S18). In this case, because of being the normal setting screen, setting is allowed even for the image forming condition for performing reduced printing.

At steps S16 and S17, while waiting for pressing of the "OK" button in a state where the GUI image capable of receiving setting operation of the image forming condition is displayed as the setting screen, the process transits to the GUI image corresponding to operation. Moreover, on the setting screen, a "cancel" button is displayed so as to be able to be pressed. Note that, a similar hardware key may be provided in the vicinity of the operation panel 102. When the "cancel" button is pressed, the process may be returned to an initial screen or the last screen.

On the other hand, at step S14, in the case of being not consistent with each other or incapable of reading at the reading portion 106 (in the case of NO), the toner cartridge 108 is judged as a nongenuine product, and the control portion 101 prohibits setting operation of reduced printing among setting operations of the image forming conditions with respect to the setting screen of the image forming apparatus 100 (step S15), and the setting screen in a state where prohibition is being performed is displayed (step S16).

After step S16, the control portion 101 judges whether or not the "OK" button is pressed on the setting screen in which reduced printing is prohibited (step S17), and in the case of judging that the "OK" button is pressed (in the case of YES), the image forming portion 103 performs image formation based on the image forming condition input from the setting screen displayed at step S16 according to predetermined operation (for example, pressing of a copy start button, a print start button or the like) by the user (step S18).

Also on the setting screen in which reduced printing is prohibited, at steps S16 and S17, while waiting in a state where the setting screen capable of receiving setting operation of the image forming condition is displayed, the process transits to the GUI image corresponding to operation.

Description will be given for an example of a method for displaying the setting screen in which reduced printing is prohibited with reference to FIG. 5. When a nongenuine product has been detected, judgment is made whether or not scaling processing is instructed from the user on the setting screen at step S16 of FIG. 4 (step S21), and in the case of NO, the processing here is finished and proceeded to step S17. In the case of YES at step S21, the process moves to a setting screen for performing scaling processing (step S22). On the setting screen for scaling processing of step S22, fixed scaling rates are displayed so as to be selectable, among them, a scaling rate which leads to reduction less than a predetermined reduction rate is deleted or displayed in gray-out.

Moreover, judgment is made whether or not a zoom button is operated on the first setting screen or on the setting screen for scaling processing (step S23), and in the case of NO, the processing here is finished and proceeded to step S17. In the case of YES at step S23, after displaying a screen in which reduction up to the predetermined reduction rate is permitted (step S24), the processing here is finished and proceeded to step S17. At step S24, change up to the above-described predetermined reduction rate is accepted, and when the zoom button is operated to a reduction direction from then as well, display is fixed with the predetermined reduction rate remained. Note that, though description will be given below, at a stage where fixing is performed or a stage where the setting screen for scaling processing is displayed at step S22, it may be informed that it is impossible to perform reduction less than the predetermined reduction rate because a nongenuine product is mounted.

Also on the setting screen in which reduced printing is prohibited, the "cancel" button is displayed so as to be able to be pressed in the same manner. Also on the setting screen in which reduced printing is prohibited, when the "cancel" button is pressed, the process may be returned to an initial screen or the last screen. This "cancel" button on the setting screen in which reduced printing is prohibited is also pressed when a desired image forming condition is not displayed on the setting screen of the image forming condition so that printing itself is desired to be canceled. In this case, it is considered that informing the reason for prohibition allows the user to recognize that it is impossible to perform reduced printing since the toner cartridge 108 is a nongenuine product, thus performing action such as replacement of the nongenuine toner cartridge 108 with a genuine product again before printing. Then, in the case of replacing with a genuine toner cartridge, a flow of FIG. 4 is executed again, which makes it possible to perform image formation with the desired image forming condition.

Description will be given for a case where print processing is performed from the information processing apparatus 200 with reference to FIG. 4 again. In the case of performing print processing from the information processing apparatus 200, a setting screen (GUI image) by the printer driver 203a is to be displayed at steps S14 to S16.

First, a judgment result at the nongenuine product judging portion 101a is set to be sent from the image forming apparatus 100 to the information processing apparatus 200 as genuine part judgment information at step S14. Then, such genuine part judgment information may be stored in the storage portion 203 of the information processing apparatus 200 to be referred in activation of the printer driver 203a and the like. This makes it possible to judge whether or not the toner cartridge 108 is a nongenuine product even on the information processing apparatus 200 side. Further, as described above, it may also be stored in the storage portion 105 of the image forming apparatus 100 as the genuine part judgment information. In this case, when the printer driver 203a of the information processing apparatus 200 is activated, the information processing apparatus 200 may request the image forming apparatus 100 to send the genuine part judgment information to obtain the genuine part judgment information from the image forming apparatus 100, and the like. Then, judgment is able to be made whether or not the toner cartridge 108 is a nongenuine product even on the information processing apparatus 200 side based on the genuine part judgment information obtained from the image forming apparatus 100.

In the case of YES at step S14, that is, when the toner cartridge 108 is judged as a genuine product, the printer driver 203a causes the normal setting screen to be displayed at step S16. In the case of NO at step S14, that is, when the toner cartridge 108 is judged as a nongenuine product, the printer driver 203a prohibits setting operation of reduced printing among setting operations of the image forming conditions at step S15 and causes such setting screen in a state where prohibition is being performed to be displayed at step S16.

The printer driver 203a judges whether or not the "OK" button is pressed on the normal setting screen or the setting screen in which reduced printing is prohibited (step S17). In the case of judging that the "OK" button is pressed (in the case of YES), the printer driver 203a instructs the image forming portion 103 to perform image formation via the network N based on the image forming condition input from the setting screen displayed at step S16 according to predetermined operation (for example, pressing of a print start button or the like) by the user (step S18). In the same manner as the case where the image forming apparatus 100 performs print processing singly, at steps S16 and S17, while waiting for pressing of the "OK" button in a state where the GUI image capable of receiving setting operation of the image forming condition is displayed, the process transits to the GUI image corresponding to operation. Of course, the processing of FIG. 5 is also applicable by setting operation from the information processing apparatus 200 side. Further, on the setting screen, the "cancel" button is displayed so as to be able to be pressed. When the "cancel" button is pressed on the setting screen displayed by the printer driver 203a, the process may be returned to an initial screen or the last screen or the setting screen itself of the printer driver 203a may be closed.

In an either case where setting operation of the image forming condition is performed in the image forming apparatus 100 or the information processing apparatus 200, when prohibition is performed at step S15, in the case of displaying the setting screen in which reduced printing is prohibited at step S16, a reason for prohibiting reduced printing is preferably informed for understanding of a user by displaying a message or the like that reduced printing is restricted since the toner cartridge 108 is a nongenuine product. In the case of prohibiting reduction less than the predetermined reduction rate, it is preferable to inform by displaying a message or the like that the reduction rate is restricted since the toner cartridge 108 is a nongenuine product.

Moreover, at step S11, in the case of judging that the ID information reading instruction is not given (in the case of NO), the process moves to step S16, and the control portion 101 or the printer driver 203a displays a setting screen in which prohibition is performed or a setting screen in which prohibition is not performed according to the previous setting.

Further, in FIG. 2, an example is taken that the image forming apparatus 100 is provided with the detection portion 109 for detecting temperature and/or humidity under an environment where the image forming apparatus 100 is installed. This detection portion 109 is used for processing as follows.

That is, when the toner cartridge 108 is judged as a nongenuine product while the temperature and/or the humidity detected by the detection portion 109 do not fall within a predetermined range, the control portion 101 or the printer driver 203a may prohibit all setting operation of the image forming conditions so as not to allow execution of image forming processing. Note that, the printer driver 203a is able to obtain information indicating a judgment result of the temperature and/or the humidity in the same manner as the method for obtaining genuine part judgment information. When the toner cartridge 108 is a nongenuine product, it is hard to perform favorable image forming processing under an environment at high temperature and high humidity, or low temperature and low humidity exceeding the predetermined range. Accordingly, all setting operation of the image forming conditions is prohibited so that wasteful image forming processing is prevented from being executed. Also in this case, it is preferable to inform the user of a reason why the image forming processing is not able to be executed so as to prompt replacement with a genuine product of the toner cartridge.

Figure 6:
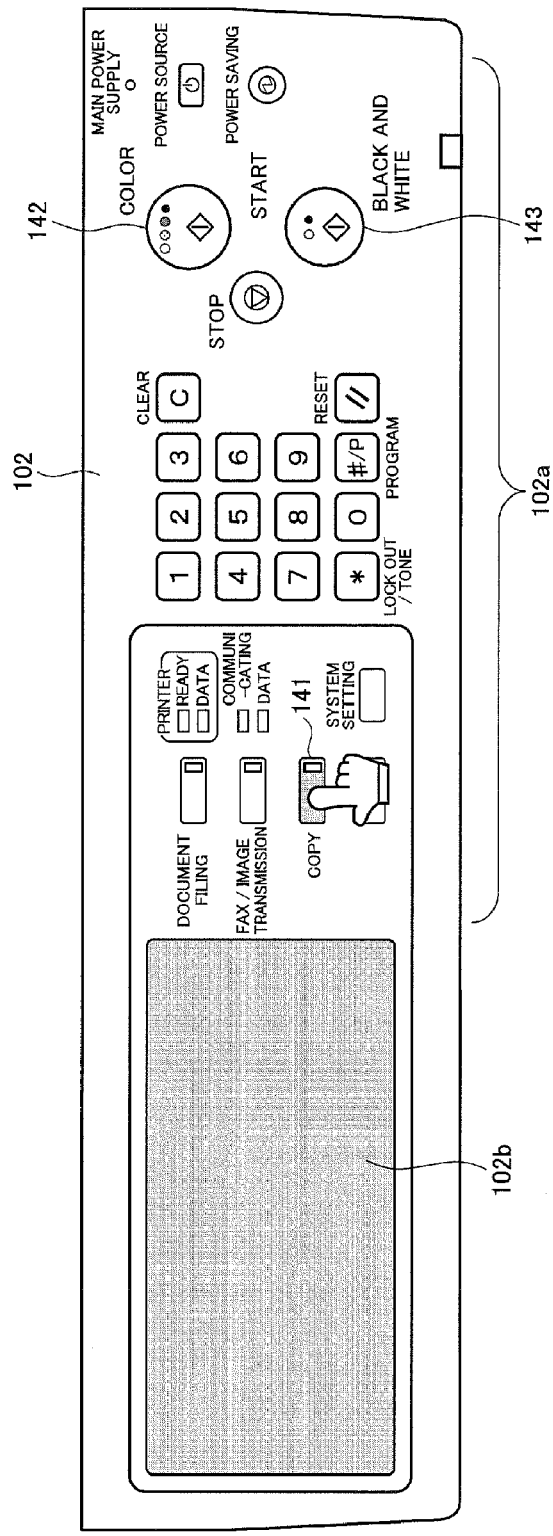
FIG. 6 is a diagram showing an example of appearance of an operation panel included in the image forming apparatus.
Figure 7:
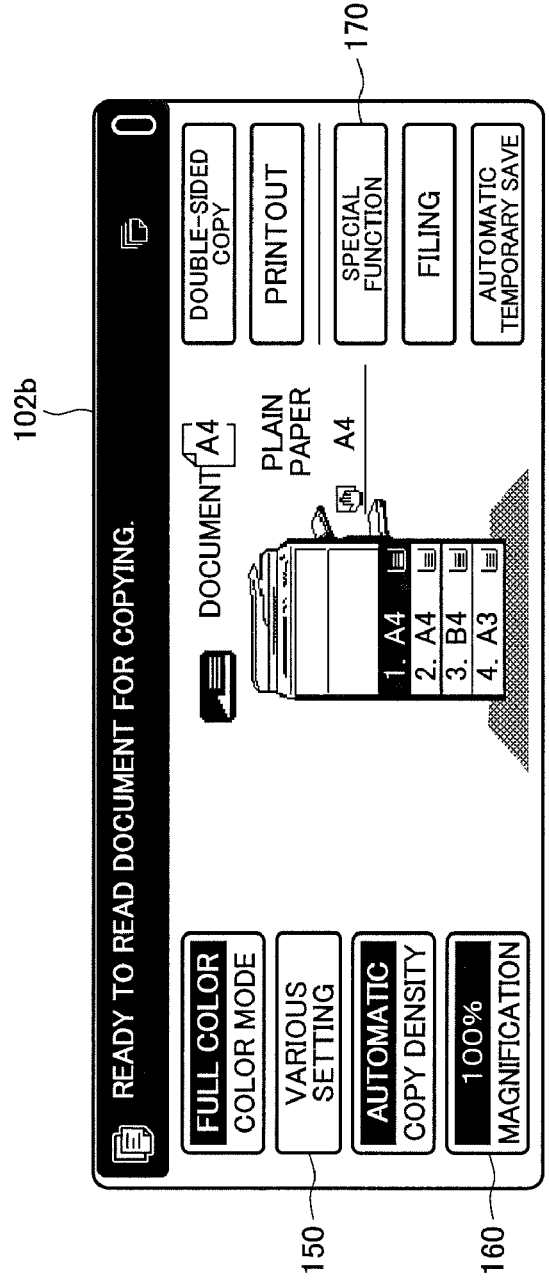
FIG. 7 is a diagram showing an example of an initial screen in a copy mode to be displayed on the operation panel of FIG. 6.

Next, description will be given for an example of screen transition of the operation panel 102 (display portion 102b) in copy processing of the image forming apparatus 100. FIG. 6 is a diagram showing an example of appearance of the operation panel 102 included in the image forming apparatus 100. The operation panel 102 is, as described above, comprised of the operation portion 102a and the display portion 102b, in which the display portion 102b is composed of a touch panel. In the case of copying, when a user presses a copy mode selection button 141 which is a hardware key provided as a part of the operation portion 102a, an initial screen in a copy mode as shown in FIG. 7 is displayed on the display portion 102b. Note that, FIG. 7 is a diagram showing an example of the initial screen in the copy mode to be displayed on the operation panel of FIG. 6. Of course, the operation portion 102a also includes a touch sensor on the display portion 102b. When a color print button 142 or a monochrome print button 143 which is a hardware key is pressed in this state, color printing or monochrome printing is performed for a document placed on a document table or an automatic document processing device, respectively.

On the initial screen of FIG. 7, respective buttons such as a "various setting" button 150, a "magnification setting" button 160 and a "special function" button 170 are displayed so as to be selectable, a layout image showing a contour of the apparatus is displayed on the center of the screen, and each size of recording paper set to paper feeding cassettes 1 to 4 and a manual feeding tray is displayed. In such a screen example of FIG. 7, the paper feeding cassette 1 in which A4 paper is contained is selected by default. Note that, when the toner cartridge 108 is a nongenuine product, for example, it is also possible to perform restriction so as not to be able to input a paper size of a B5 size or less with respect to an A4 document, and in the case of performing such restriction, a paper feeding cassette in which B5 paper is contained, even if existing, is made so as not to be selectable.

Figure 8:
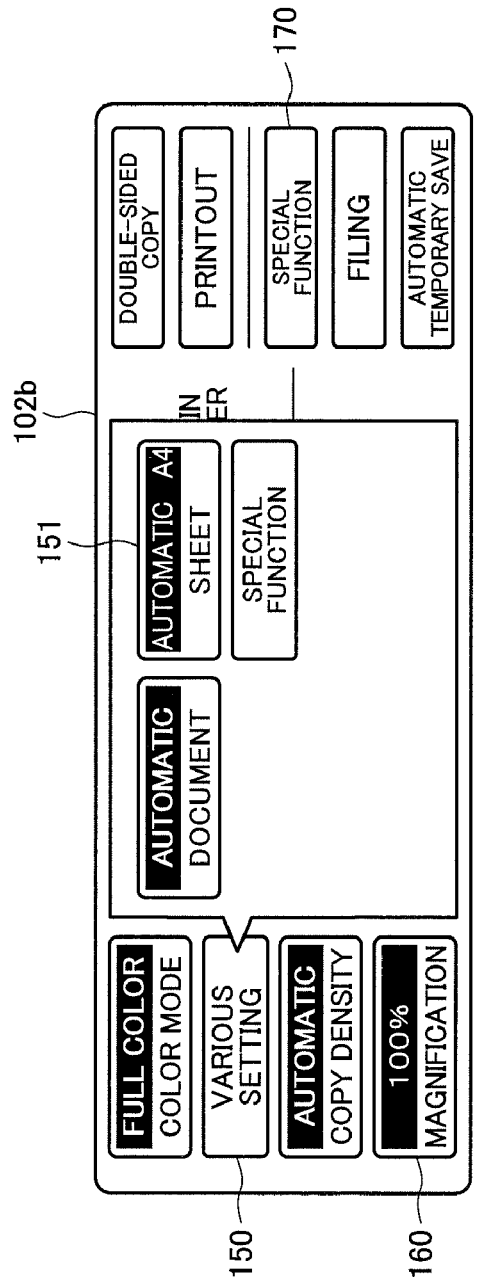
FIG. 8 is a diagram showing an example of a setting screen when a "various setting" button is selected from the initial screen of FIG. 7.

Then, when a user touches, for example, the "various setting" button 150 from the initial screen of FIG. 7, a pop-up image which shows a button for performing setting concerning a size or a kind of a document, a button 151 for performing setting concerning a size or a kind of paper, and the "special function" button (button for transiting to the same screen as when the button 170 is pressed) is displayed, as shown in FIG. 8. FIG. 8 is a diagram showing an example of a setting screen when the "various setting" button is selected from the initial screen of FIG. 7, and is a screen example which is displayed whether the toner cartridge 108 is a genuine product or a nongenuine product.

Figure 9:
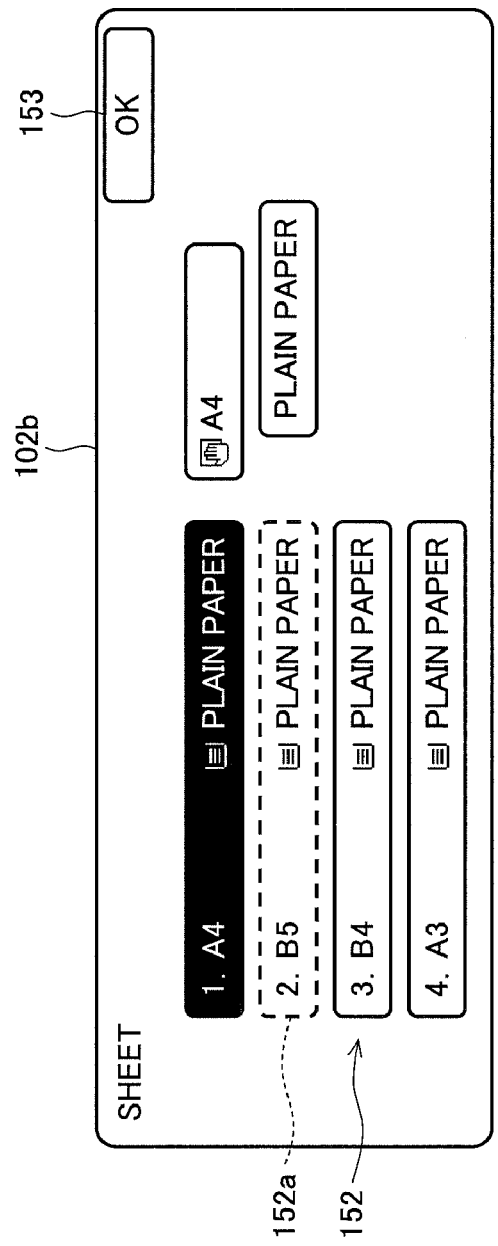
FIG. 9 is a diagram showing an example of a setting screen displayed when a button concerning paper is selected from the setting screen of FIG. 8, which is a setting screen for selecting a paper size in a case where the toner cartridge is a nongenuine product.

Description will be given for a setting screen when the above-described button 151 is selected with reference to FIG. 9. FIG. 9 is a diagram showing an example of a setting screen displayed when a button concerning paper is selected from the setting screen of FIG. 8, which is a setting screen for selecting a paper size in a case where the toner cartridge is a nongenuine product.

In a case where the above-described button 151 is touched on the setting screen of FIG. 8, when the toner cartridge 108 is a genuine product, a setting screen for selecting a paper feeding cassette of paper is displayed. On this setting screen, differently from that of FIG. 9, a paper feeding cassette of B5 paper is displayed so as to be selectable similarly to other paper feeding cassettes. That is, in the case of a genuine product, in a list of paper feeding cassettes 152 in FIG. 9, respective paper feeding cassettes including a paper feeding cassette of B5 paper 152a are displayed in the similar display form, regardless of the paper size.

On the other hand, when the toner cartridge 108 is a nongenuine product, a document size is detected in advance, for example, as shown in FIG. 9, the paper feeding cassette of B5 paper is displayed in gray-out in the list 152 with respect to an A4 document, and the paper feeding cassette of B5 paper, even if existing, is made so as not to be selectable. As exemplifying the paper feeding cassette of B5 paper 152a with dotted lines in FIG. 9, the gray-out display may be different from display of other paper feeding cassettes. Further, though not illustrated, the paper feeding cassette of B5 paper may be deleted instead of the gray-out display or the like, or, as described above, a message that reduced printing is not able to be performed since the toner cartridge 108 is a nongenuine product may be informed by displaying at the same time.

Figure 10:
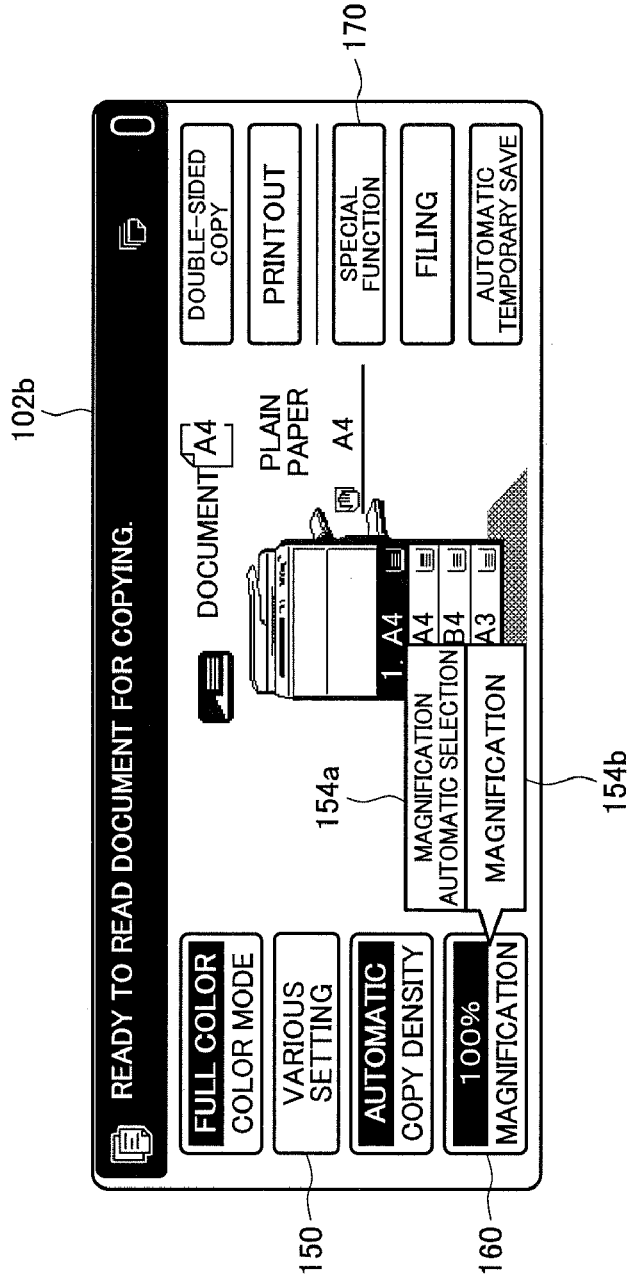
FIG. 10 is a diagram showing an example of a setting screen when a "magnification setting" button is selected from the initial screen of FIG. 7.

Further, when a user touches, for example, the "magnification setting" button 160 from the initial screen of FIG. 7, a pop-up image in which a button 154a for automatically selecting magnification of scaling according to document and paper sizes and a button 154b for setting magnification of scaling are displayed is displayed, as shown in FIG. 10. FIG. 10 is a diagram showing an example of a setting screen when the "magnification setting" button is selected from the initial screen of FIG. 7, and is a screen example which is displayed whether the toner cartridge 108 is a genuine product or a nongenuine product.

Figure 11:
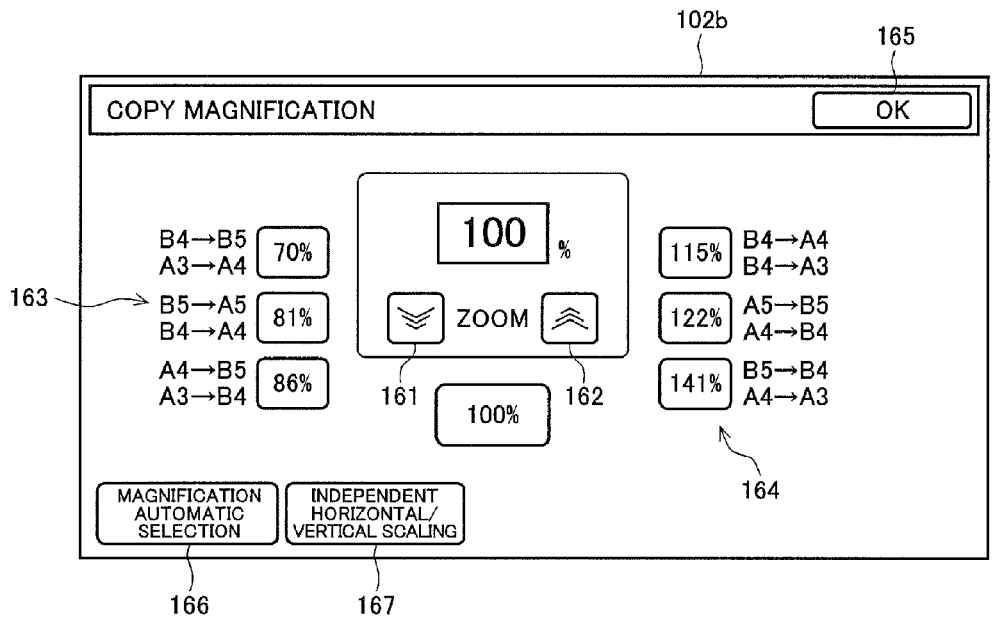
FIG. 11 is a diagram showing an example of a setting screen displayed when a button for setting magnification is selected from the setting screen of FIG. 10, which is a setting screen for setting a scaling rate in a case where the toner cartridge is a genuine product.
Figure 12:
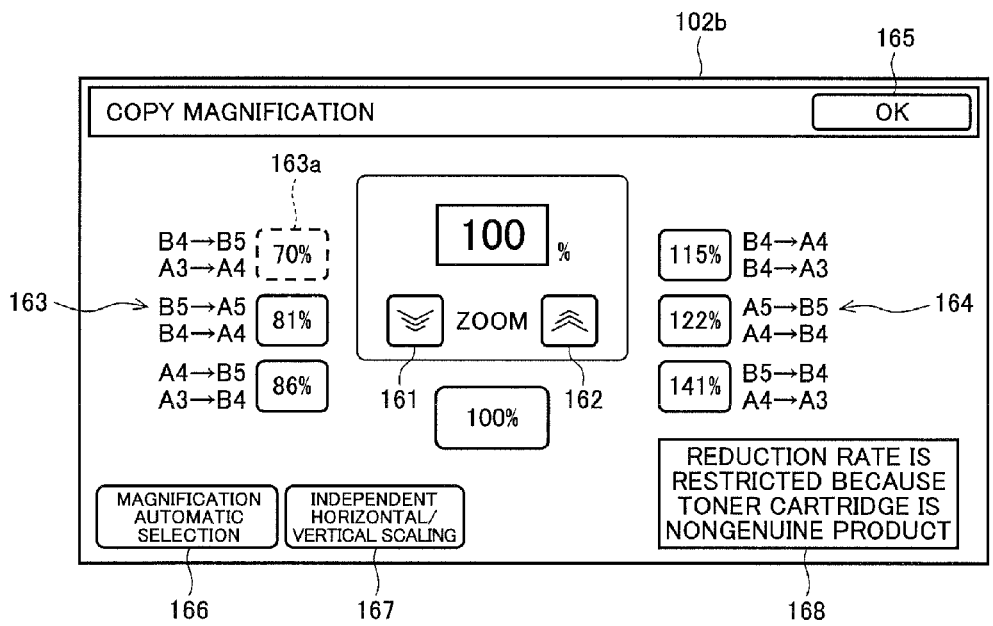
FIG. 12 is a diagram showing an example of a setting screen displayed when a button for setting magnification is selected from the setting screen of FIG. 10, which is a setting screen for setting magnification in a case where the toner cartridge is a nongenuine product.

Description will be given for a setting screen when the above-described button 154b is selected with reference to FIG. 11 and FIG. 12. FIG. 11 and FIG. 12 are setting screens displayed when the button for setting a scaling rate is selected from the setting screen of FIG. 10, FIG. 11 is a diagram showing an example of a setting screen for setting a scaling rate in a case where the toner cartridge is a genuine product, and FIG. 12 is a diagram showing an example of a setting screen for setting magnification in a case where the toner cartridge is a nongenuine product.

In a case where the above-described button 154b is touched on the setting screen of FIG. 10, when the toner cartridge 108 is a genuine product, as shown in FIG. 11, a setting screen which shows a button group 163 for selection in the case of reduction with the scaling rate as a prescribed value, a button group 164 for selection in the case of enlargement with the scaling rate as a prescribed value, a reduction zoom button 161 for zooming to a reduction direction from the displayed scaling rate, and an enlargement zoom button 162 for zooming to an enlargement direction from the displayed scaling rate is displayed. Moreover, on the setting screen of FIG. 11 and the setting screen of FIG. 12 described below, with an "OK" button 165 for completing magnification setting, a "magnification automatic selection" button 166 and an "independent horizontal/vertical scaling" button 167 are also displayed so as to be selectable.

On the other hand, when the toner cartridge 108 is a nongenuine product, if the above-described button 154b is touched on the setting screen of FIG. 10, as shown in FIG. 12, a button 163a for selecting the ratio of one side as 70% is displayed in a display form different from that of other buttons so as not to be selectable among the button group 163 displayed in FIG. 11. Of course, the button 163a may be deleted. Note that, in this example, since an example that, for example, scaling to magnification that the ratio of one side is less than 80% is prohibited is taken, only the button 163a is displayed in a different form, however, buttons for selecting 81% and 86% illustrated in FIG. 12 may be also displayed in a display form different from that of the button group 164 and made so as not to be selectable in an example that, for example, reduction with all reduction rates is prohibited. Moreover, on the setting screen of FIG. 12, an example that a message 168 that reduced printing is restricted since the toner cartridge 108 is a nongenuine product is informed by displaying is taken.

Figure 13:
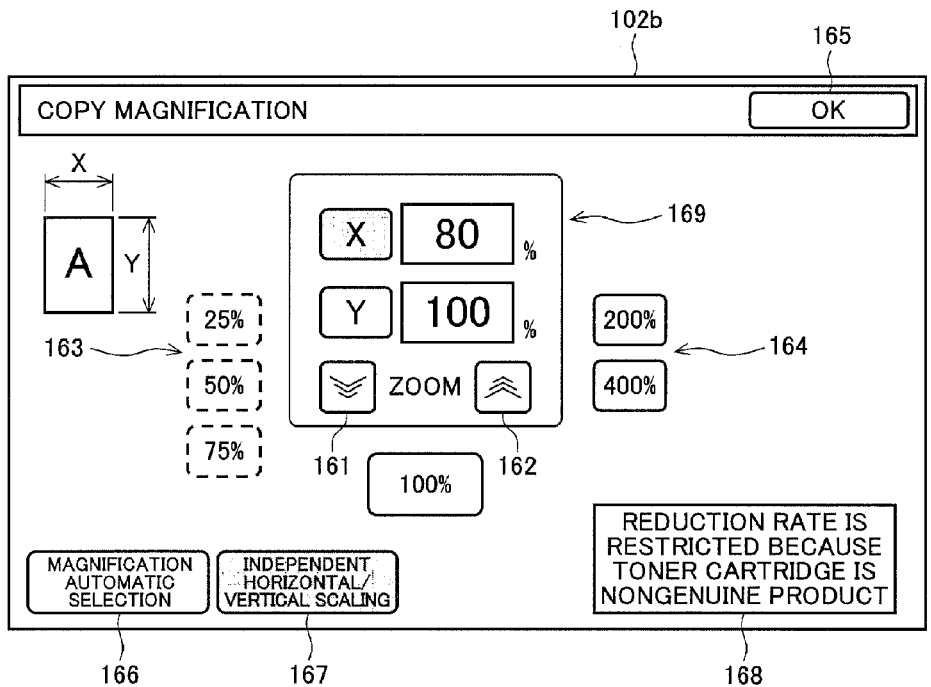
FIG. 13 is a diagram showing an example of a setting screen displayed when an "independent horizontal/vertical scaling" button is selected from the setting screen of FIG. 12, which is a setting screen for independently setting magnification vertically and horizontally in a case where the toner cartridge is a nongenuine product.

Description will be given for a setting screen when the "independent horizontal/vertical scaling" button 167 is selected from the setting screen of FIG. 12 in a case where the toner cartridge is a nongenuine product with reference to FIG. 13. FIG. 13 is a diagram showing an example of a setting screen displayed when the "independent horizontal/vertical scaling" button is selected from the setting screen of FIG. 12, which is a setting screen for independently setting magnification vertically and horizontally in a case where the toner cartridge is a nongenuine product.

When the "independent horizontal/vertical scaling" button 167 is touched on the setting screen of FIG. 12, since it is the case where the toner cartridge 108 is a nongenuine product, the setting screen as shown in FIG. 13 is displayed. On the setting screen of FIG. 13, the button group 163 for selection in the case of reduction with a horizontal/vertical scaling rate as a same prescribed value is displayed so as not to be selectable as well as the button group 164 for selection in the case of enlargement with the horizontal/vertical scaling rate as the same prescribed value, the reduction zoom button 161 for zooming to a reduction direction from the displayed scaling rate, and the enlargement zoom button 162 for zooming to an enlargement direction from the displayed scaling rate are displayed so as to be selectable. Further, on the setting screen of FIG. 13, with the "OK" button 165 for completing magnification setting, the "magnification automatic selection" button 166 is displayed so as to be selectable, and the "independent horizontal/vertical scaling" button 167 corresponding to the setting which is currently performed is displayed in gray-out. Note that, buttons shown with dotted lines in FIG. 9, FIG. 12, FIG. 13 and the like (for example, the button group 163) may be displayed in gray-out using light gray as exemplified with the button 167.

In addition, on the setting screen of FIG. 13, a magnification setting field 169 which includes the reduction zoom button 161 and the enlargement zoom button 162, as well as an X-direction (horizontal direction) selection button and an X-direction scaling rate (in this example, the ratio of one side is 80% currently), and a Y-direction (vertical direction) selection button and a Y-direction scaling rate (in this example, the ratio of one side is 100% currently) is also displayed. A user selects the X-direction selection button to be in the state of being gray-out, and touches the zoom button 161 or 162 to change the scaling rate. At this time, a setting value is set at 100% by default and the scaling rate is reduced each time the user touches the reduction zoom button 161, and at a stage where the ratio of one side becomes 80%, display is fixed at 80% so as not to reduce any more as well as the above-described message 168 is informed by displaying. In this example, since the example that scaling to magnification less than 80% is prohibited is taken, even if trying to zoom to be 80% or less, it is fixed at 80%, however, in a case where the predetermined reduction rate has other value, processing is performed according to the value.

Moreover, though an example that setting is performed by the scaling rate with length of one side of a read document or recording paper as a reference has been taken on the setting screens of FIG. 11 to FIG. 13, setting may be enabled by the scaling rate with an area of a read document or recording paper as a reference. Further, though it is assumed that a nongenuine product is mounted on the setting screens of FIG. 12 and FIG. 13, as the above-described predetermined reduction rate in this case, for example, by employing about 86% for the ratio of one side and about 75% for the ratio of an area of a read document/recording paper so as not to reduce more than this, it is possible to confirm even rules, a comma, a period and the like, except for a case where a printed image is extremely poor.

Figure 14:
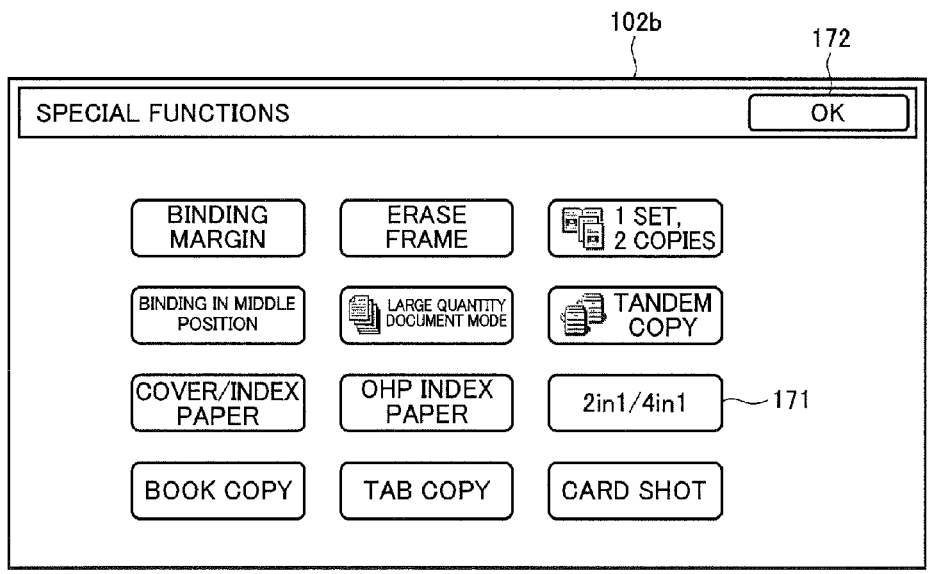
FIG. 14 is a diagram showing an example of a setting screen displayed when a "special function" button is selected from the setting screen of FIG. 10.

Description will be given for a setting screen when the "special function" button 170 is selected on any one of the setting screens of FIG. 7, FIG. 8 and FIG. 10, with reference to FIG. 14 and FIG. 15. FIG. 14 is a diagram showing an example of the setting screen displayed when the "special function" button is selected from the setting screen of FIG. 10, and FIG. 15 is a diagram showing an example of a setting screen displayed when a "2 in ¼ in 1" button is selected on the setting screen of FIG. 14, which is a setting screen for setting aggregate printing in a case where the toner cartridge is a nongenuine product.

In a case where the "special function" button 170 (or the "special function" button of FIG. 8 corresponding thereto. Hereinafter, the same is applied.) is selected, as shown in FIG. 14, a button for selecting various types of special functions including a "2 in ¼ in 1" button 171 and an "OK" button 172 for completing setting of the special function are displayed so as to be selectable. In a case where the "2 in ¼ in 1" button 171 is selected, the setting screen as shown in FIG. 15 is displayed. On the setting screen of FIG. 15, an aggregation number selection area 173 for selecting 2 in 1 or 4 in 1, a layout selection area 174 for selecting a layout (order of aggregation) in the selected aggregate printing, and a border line selection area 175 for selecting how to draw or not to draw border lines are displayed so as to be selectable.

Figure 15:
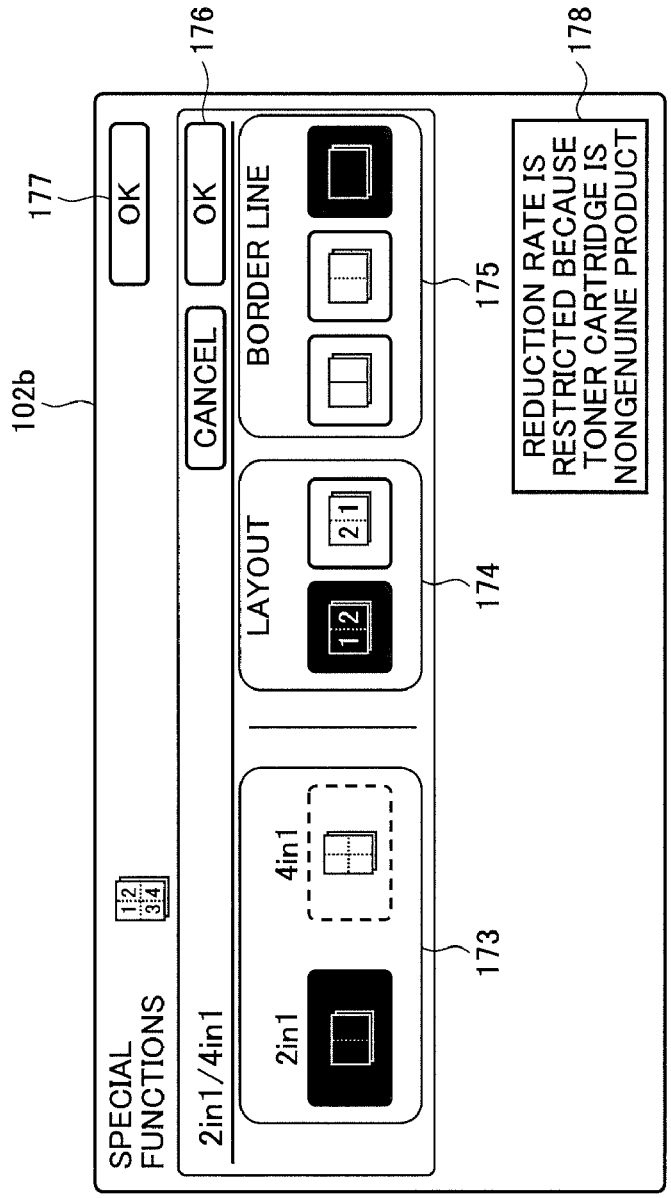
FIG. 15 is a diagram showing an example of a setting screen displayed when a "2 in ¼ in 1" button is selected on the setting screen of FIG. 14, which is a setting screen for setting aggregate printing in a case where the toner cartridge is a nongenuine product.

On the setting screen of FIG. 15, an example for the case where the predetermined reduction rate is 50% in the area ratio is taken, and in the aggregation number selection area 173, 2 in 1 by which the are ratio is reduced to 50% is displayed so as to be selectable, while 4 in 1 which leads to the scaling rate for reduction less than 50% is displayed so as not to be selectable. Further, here as well, an example that a message 178 similar to the above-described message 168 is displayed is taken. Note that, in a case where reduced printing itself is not permitted, a case where, for example, the predetermined reduction rate is 75% in the area ratio, and the like, the "2 in ¼ in 1" button 171 itself may be also displayed in a different form from that of other buttons or deleted so as not to be selectable in FIG. 14. Further, on the setting screen of FIG. 15, with an "OK" button 176 for completing setting of aggregate printing to return to the setting screen of FIG. 14, an "OK" button 177 for completing setting of the special function to return to the setting screen of FIG. 7 is displayed so as to be selectable.

Hereinabove, as has been described with reference to FIG. 12 to FIG. 15, the control portion 101 may perform processing for masking by gray-out or the like, or hide the setting item of the special function to be prohibited, to cause setting operation not to be performed. Alternatively, the control portion 101 may cause setting operation of reduction processing not to be performed by not displaying the special function itself.

Figure 16:
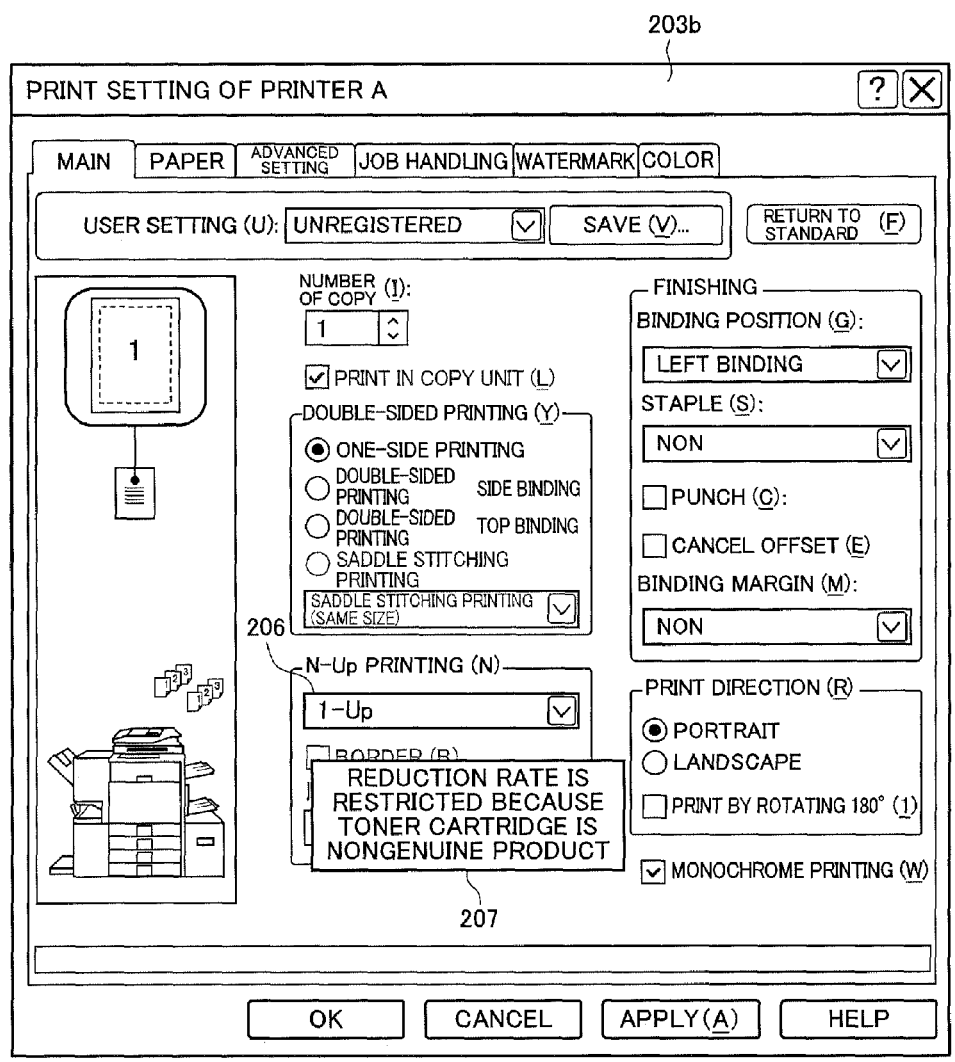
FIG. 16 is a diagram showing an example of an image forming condition setting screen displayed by a printer driver in a case where the toner cartridge is a nongenuine product.
Figure 17:
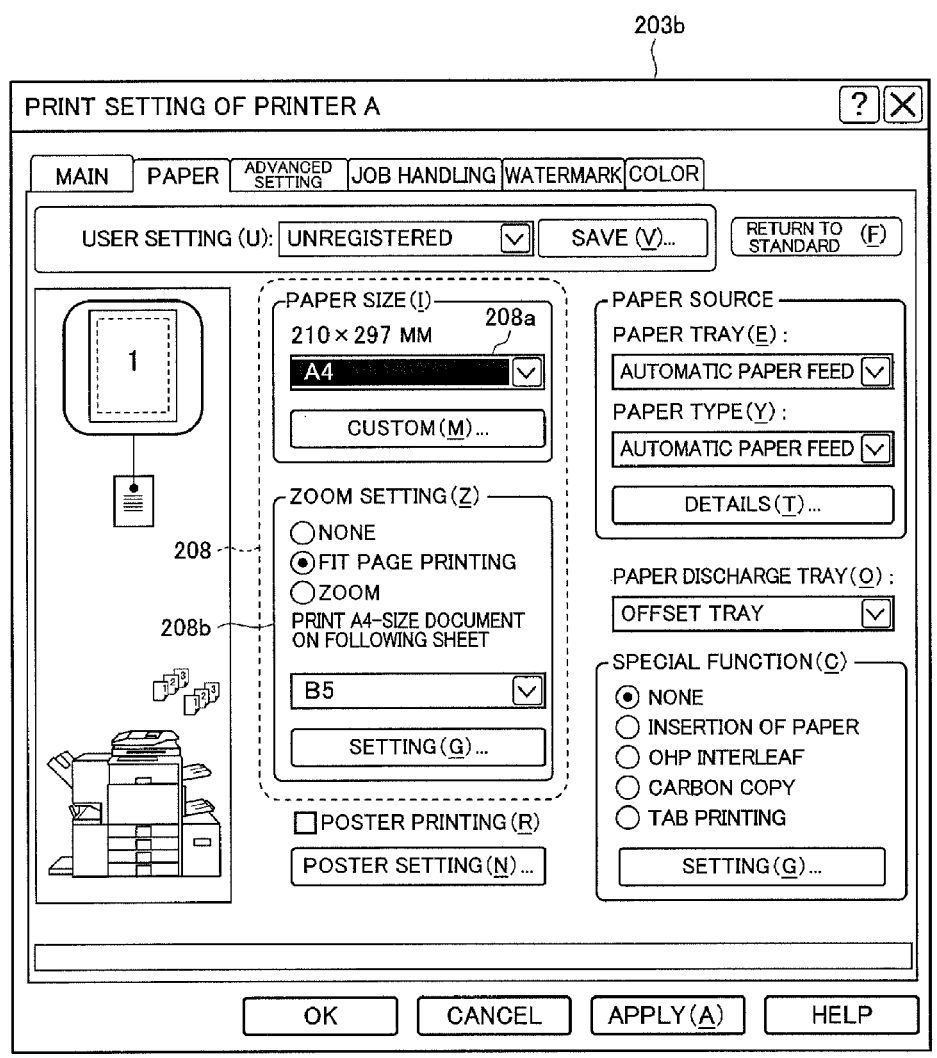
FIG. 17 is a diagram showing an example of an image forming condition setting screen displayed by the printer driver in a case where the toner cartridge is a genuine product.
Figure 18:
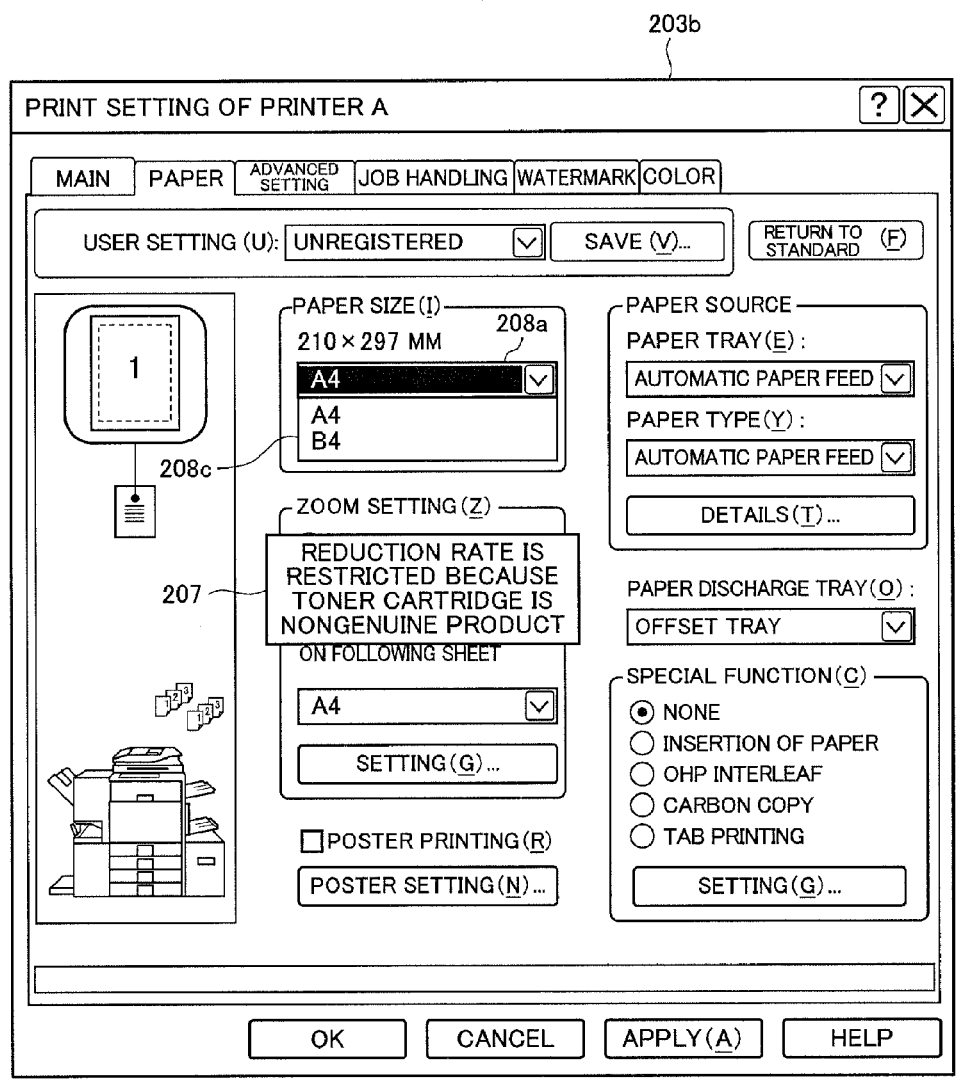
FIG. 18 is a diagram showing another example of an image forming condition setting screen displayed by the printer driver in a case where the toner cartridge is a nongenuine product.

Next, description will be given for a screen example of the printer driver 203a of the information processing apparatus 200 in print processing of the image forming apparatus 100 with reference to FIG. 16 to FIG. 18. FIG. 16 to FIG. 18 are diagrams showing examples of an image forming condition setting screen displayed by the printer driver. FIG. 16 and FIG. 18 show setting screen examples in a case where the toner cartridge 108 is a nongenuine product, and FIG. 17 shows a setting screen example in the case of a genuine product. Note that, a setting screen 203b of FIG. 16 to FIG. 18 is a setting screen of the printer driver 203a corresponding to a printer A as the image forming apparatus 100, and it is possible that, by selecting an "OK" button which is illustrated, setting of the image forming condition (that is, print condition) is completed, and, by selecting a "cancel" button which is illustrated, this setting is discarded and finished.

On the setting screen 203b of FIG. 16, an "N-up printing" pull-down button 206 is displayed, and in a case where the toner cartridge 108 is a genuine product, by selecting this button 206, selectable pull-down menus are displayed from among aggregate printing from "1-Up" (no aggregation) to "16-Up" (aggregate 16 sheets to one sheet of recording paper), however, in a case where the toner cartridge 108 is a nongenuine product, as illustrated here, only "1-Up" is selectable (that is, aggregate printing is not able to be performed virtually). Furthermore, on the setting screen 203b of FIG. 16, a user is informed by displaying a message 207 that reduced printing is restricted since the toner cartridge 108 is a nongenuine product.

Note that, in this example, an example is taken that in a case where a nongenuine product is mounted, prohibition is performed on reduction with any scaling rate, that is, by any reduction rate, however, in a case where a value less than 100% is employed as the above-described reduction rate, it is also possible that, with a paper size specified from an application as a reference, only one which results in the number of aggregation leading to reduced printing reducing less than the above-described predetermined reduction rate (for example, 75% or 80% in the ratio of one side) is made so as not to be selectable. Furthermore, in the case of employing processing for prohibiting reduced printing even with any reduction rate when a nongenuine product is mounted, a setting field itself of N-Up printing which is one of the special functions may not be displayed or be displayed in gray-out or the like to have a different display form from that of other areas.

On the setting screen 203b of FIG. 17, in a scaling setting area 208, a "paper size" pull-down button 208a and a zoom setting area 208b are displayed. By selecting this pull-down button 208a, a user is able to select a size of recording paper from paper set in the image forming apparatus 100. Further, by selecting a "none" from radio buttons for selecting any of "none", "fit page printing" and "zoom", the user is able to perform printing without scaling. Moreover, by selecting the "fit page printing" from these radio buttons and selecting a paper size from the pull-down menu, it is possible to perform fit page printing with this selected paper ("B5" in this example). Since an example that there is no nongenuine product is taken on the setting screen 203b of FIG. 17, selection is enabled even in the case of reduction such as from "A4" to "B5". Further, by selecting the "zoom" from these radio buttons and selecting a "setting" button, the user is able to open another screen for setting a specific scaling rate to perform printing in a state where the scaling rate is set arbitrarily.

The setting screen 203b of FIG. 18 shows a state where the "paper size" pull-down button 208a is selected and a pull-down menu 208c is displayed. In a case where the toner cartridge 108 is a nongenuine product, as illustrated, only selection items by which reduced printing is not able to be performed are displayed for selection items displayed in this pull-down menu 208c. In this example, for example, with respect to image data of an A4 size created by a document creating application or the like, only "A4" and "B4" are displayed so as to be selectable as recording paper and only equal magnification or enlargement are allowed. Furthermore, on the setting screen 203b of FIG. 18, by displaying the above-described message 207, the user is informed that reduced printing is prohibited.

Note that, in this example as well, an example is taken that reduction is prohibited even with any scaling rate in the case of mounting a nongenuine product, but in the case of employing a value less than 100% as the above-described predetermined reduction rate, it is also possible that, with a paper size specified from an application as a reference, a size of recording paper which results in reduction printing reducing less than the above-described predetermined reduction rate (for example, 75%, 80% or the like) is made so as not to be selectable.

Hereinabove, as has been described with reference to FIG. 16 to FIG. 18, the printer driver 203a may perform processing for masking by gray-out or the like the setting item of the special function to be prohibited, to cause setting operation not to be performed. Alternatively, the printer driver 203a may cause setting operation of reduction processing not to be performed by not displaying the special function itself such as N-Up.

As described above, in the case of detecting that a nongenuine product of a toner is used, in both case of copying in the image forming apparatus 100 and printing from the information processing apparatus 200, it is possible to restrict reduced printing or the magnification for reduction, thus making it possible to prevent further deterioration of quality by reduced printing even in a state where print quality of the nongenuine product of a toner is poor. Accordingly, in the present invention, it is possible to suppress waste of consumables such as recording paper and keep redoing of copy/printing or the like to the minimum, thus making it possible to improve user's convenience.

Further, as exemplified for a flow of control in the image forming apparatus and the image forming system, the present invention can take a from as the image forming method by means of the image forming apparatus as described above. To describe with reference to FIG. 2, this image forming method has a judging step that the nongenuine product judging portion 101a judges whether or not a replacement part of the image forming portion 103 is a nongenuine product, a prohibition step that the control portion 101 or the printer driver 203a for the image forming apparatus 100 installed in the information processing apparatus 200 connected to the image forming apparatus 100 via the network, in the case of judging that the replacement part of the image forming portion 103 is a nongenuine product at the judging step, prohibits setting operation concerning reduced printing among setting operations of image forming conditions, and an image forming step that the image forming portion 103 performs image formation based on the set image forming condition. Other applications are as described for the image forming apparatus and the image forming system.

EXPLANATIONS OF LETTERS OR NUMERALS

1 . . . exposure unit, 2 . . . developing equipment, 3 . . . photoreceptor drum, 4 . . . cleaner unit, 5 . . . charger, 6 . . . intermediate transfer belt unit, 7 . . . fixing unit, 10 . . . transfer roller, 11a, 11b . . . pick-up roller, 12a, 12b, 12c, 12d . . . conveying roller, 13 . . . registration roller, 61 . . . intermediate transfer belt, 62 . . . intermediate transfer belt driving roller, 63 . . . intermediate transfer belt driven roller, 64 . . . intermediate transfer roller, 65 . . . intermediate transfer belt cleaning unit, 71 . . . heat roller, 72 . . . pressurizing roller, 73 . . . outer heating belt, 81 . . . paper feeding cassette, 82 . . . manual paper feeding cassette, 90 . . . image reading means, 91 . . . paper discharge tray, 92 . . . document platen, 93 . . . light source unit, 94 . . . mirror unit, 95 . . . CCD, 100 . . . image forming apparatus, 101 . . . control portion, 101a . . . nongenuine product judging portion, 102 . . . operation panel, 102a . . . operation portion, 102b, 205 . . . display portion, 103 . . . image forming portion, 104, 201 . . . communication portion, 105, 203 . . . storage portion, 106 . . . reading portion, 107 . . . sensor circuit, 108 . . . toner cartridge, 108a . . . IC chip, 109 . . . detection portion, 120 . . . automatic document processing device, 130 . . . apparatus, 200 . . . information processing apparatus, 202 . . . arithmetic processing portion, 203a . . . printer driver, 203b . . . setting screen, and 204 . . . input portion.

The invention claimed is:

1. An image forming apparatus comprising:
an image forming portion for forming an image;
a nongenuine product judging portion for judging whether or not a replacement part of the image forming portion is a nongenuine product;
an operation receiving portion for receiving user operation including setting operation of an image forming condition; and
a control portion for controlling image formation of the image forming portion based on the image forming condition set from the operation receiving portion, wherein
in a case where the replacement part of the image forming portion is judged as a nongenuine product by the nongenuine product judging portion, the control portion prohibits setting operation concerning reduced printing among the setting operations of the image forming conditions.

2. The image forming apparatus as defined in claim 1, wherein
the setting operation concerning the reduced printing prohibited by the control portion is setting operation for reducing an image to be printed with a reduction rate less than predetermined one.

3. The image forming apparatus as defined in claim 1, wherein
the setting operation concerning the reduced printing prohibited by the control portion includes setting operation for performing aggregate printing.

4. The image forming apparatus as defined in claim 1, wherein
the setting operation concerning the reduced printing prohibited by the control portion includes setting operation for performing reduced printing so as to fit to a paper size.

5. An image forming system in which an image forming apparatus having an image forming portion for forming an image and a nongenuine product judging portion for judging whether or not a replacement part of the image forming portion is a nongenuine product, and an information processing apparatus in which a printer driver for the image forming apparatus is installed are connected via a network, wherein
the printer driver receives information indicating a judgment result at the nongenuine product judging portion from the image forming apparatus via the network, judges whether or not the replacement part of the image foaming portion is a nongenuine product based on the information, and in a case where judgment is made as a nongenuine product, displays a user interface image which prohibits setting operation concerning reduced printing among the setting operations of image forming conditions.

6. The image forming system as defined in claim 5, wherein the setting operation concerning the reduced printing prohibited by the printer driver is setting operation for reducing an image to be printed with a reduction rate less than predetermined one.

7. The image forming system as defined in claim 5, wherein the setting operation concerning the reduced printing prohibited by the printer driver includes setting operation for performing aggregate printing.

8. The image forming system as defined in claim 5, wherein the setting operation concerning the reduced printing prohibited by the printer driver includes setting operation for performing reduced printing so as to fit to a paper size.

9. An image forming method by means of an image forming apparatus comprising an image forming portion for forming an image, a control portion for controlling image formation of the image forming portion based on an image forming condition set through an operation receiving portion, or a printer driver installed in an information processing apparatus which is connected to the image forming apparatus via the network, and a non-genuine product judging portion for judging whether or not a replacement part of the image forming portion is a non-genuine product, wherein the image forming method comprising:
a judging step that the nongenuine product judging portion judges whether or not a replacement part of the image forming portion is a nongenuine product,
a prohibition step that the control portion or the printer driver, in the case of judging that the replacement part of the image forming portion is a nongenuine product at the judging step, prohibits setting operation concerning reduced printing among setting operations of image forming conditions, and an image forming step that the image forming portion performs image formation based on the set image forming condition.

\* \* \* \* \*